US 007143109B2

(12) United States Patent
Nagral et al.

(10) Patent No.: US 7,143,109 B2
(45) Date of Patent: Nov. 28, 2006

(54) INFORMATION STORAGE AND RETRIEVAL SYSTEM FOR STORING AND RETRIEVING THE VISUAL FORM OF INFORMATION FROM AN APPLICATION IN A DATABASE

(75) Inventors: Ajit S. Nagral, Shrewsbury, MA (US); Fitzhugh Gordon Bush, III, Holliston, MA (US); Edward Lawrence Bayiates, Westborough, MA (US); Carey Edwin Gregory, Collinsville, CT (US); Carl Philip Emmanuel Dos Santos, Northborough, MA (US); Milind Kaulgud, Boxborough, MA (US)

(73) Assignee: Nugenesis Technologies Corporation, Milford, MA (US)

( * ) Notice: Subject to any disclaimer, the term of this patent is extended or adjusted under 35 U.S.C. 154(b) by 184 days.

(21) Appl. No.: 09/880,393

(22) Filed: Jun. 13, 2001

(65) Prior Publication Data
US 2001/0044798 A1    Nov. 22, 2001

Related U.S. Application Data

(62) Division of application No. 09/213,019, filed on Dec. 16, 1998, now Pat. No. 6,260,044.

(60) Provisional application No. 60/073,701, filed on Feb. 4, 1998.

(51) Int. Cl.
*G06F 17/30* (2006.01)
(52) U.S. Cl. .................... 707/104.1; 707/1; 707/7; 707/102
(58) Field of Classification Search .............. 707/3, 707/102, 204, 1, 6, 7, 100, 104.1; 715/500, 715/526; 345/419, 606
See application file for complete search history.

(56) References Cited

U.S. PATENT DOCUMENTS 4,800,510 A    1/1989    Vinberg et al.

(Continued)

FOREIGN PATENT DOCUMENTS

EP    0 961 211 A2    1/1999

OTHER PUBLICATIONS

Chrom Merge 1.5 Addendum, New Features in Chrom Merge 1.5, 1995, pp. 1-4.

(Continued)

*Primary Examiner*—Alford Kindred
*Assistant Examiner*—Marc Filipczyk
(74) *Attorney, Agent, or Firm*—Muirhead and Saturnelli, LLC

(57)    ABSTRACT

The visual form of data from a computer program is received and stored in a database. The visual form of the data may be received, for example, in response to a print operation by the computer program or by some other operation such as a cut and paste sequence of operations or by sending the data to another application. The visual form of the data may be stored as a vector image that permits scalability. The visual form of the data may be stored with other identifying information or tags in the database to facilitate searching of the database. The data in the database may be encoded in a manner that ensures data integrity and that permits detection of when data has been compromised. In one embodiment, a service layer application is provided to control access to the database by performing encoding and decoding of the data in the database. The service layer may have an application programming interface that permits many applications to have access to the database. Another application may be provided for accessing the visual form of the data from the database and for providing this data to another computer program. Such an application permits a user to create compound documents from data in the database using the other computer program.

44 Claims, 18 Drawing Sheets

U.S. PATENT DOCUMENTS

| | | | |
|---|---|---|---|
| 4,843,569 A | 6/1989 | Sawada et al. | |
| 4,852,019 A | 7/1989 | Vinberg et al. | |
| 4,933,880 A | 6/1990 | Borgendale et al. | |
| 4,941,125 A | 7/1990 | Boyne | |
| 4,943,868 A | 7/1990 | Yoshinaga et al. | |
| 5,060,135 A | 10/1991 | Levine et al. | |
| 5,083,262 A | 1/1992 | Haff, Jr. | |
| 5,086,408 A | 2/1992 | Sakata | |
| 5,119,465 A | 6/1992 | Jack et al. | |
| 5,119,492 A | 6/1992 | Shimizu et al. | |
| 5,231,578 A | 7/1993 | Levin et al. | |
| 5,321,831 A | 6/1994 | Hirose | |
| 5,339,409 A | 8/1994 | Sakuragi | |
| 5,353,397 A | 10/1994 | Yokoyama et al. | |
| 5,379,376 A | 1/1995 | Bednowitz | |
| 5,404,435 A | 4/1995 | Rosenbaum | |
| 5,432,894 A | 7/1995 | Funaki | |
| 5,448,692 A | 9/1995 | Ohta | |
| 5,452,369 A | 9/1995 | Lionti et al. | |
| 5,467,444 A * | 11/1995 | Kawamura et al. | 345/441 |
| 5,517,605 A | 5/1996 | Wolf | |
| 5,519,818 A | 5/1996 | Peterson | |
| 5,521,722 A | 5/1996 | Colvill et al. | |
| 5,524,202 A | 6/1996 | Yokohama | |
| 5,528,734 A | 6/1996 | Sanchez | |
| 5,546,390 A | 8/1996 | Stone | |
| 5,546,572 A | 8/1996 | Seto et al. | |
| 5,561,796 A | 10/1996 | Sakamoto et al. | |
| 5,572,601 A | 11/1996 | Bloomberg | |
| 5,577,188 A | 11/1996 | Zhu | |
| 5,579,471 A | 11/1996 | Barber et al. | |
| 5,611,036 A | 3/1997 | Berend et al. | |
| 5,625,833 A | 4/1997 | Levine et al. | |
| 5,630,041 A | 5/1997 | Mills et al. | |
| 5,630,120 A * | 5/1997 | Vachey | 707/2 |
| 5,630,121 A | 5/1997 | Braden-Harder et al. | |
| 5,652,881 A | 7/1997 | Takahashi et al. | |
| 5,659,742 A | 8/1997 | Beattie et al. | |
| 5,664,127 A | 9/1997 | Anderson et al. | |
| 5,664,182 A | 9/1997 | Nierenberg et al. | |
| 5,687,254 A | 11/1997 | Poon et al. | |
| 5,689,287 A | 11/1997 | Mackinlay et al. | |
| 5,699,492 A | 12/1997 | Karaki | |
| 5,737,442 A | 4/1998 | Alam | |
| 5,781,714 A | 7/1998 | Collins et al. | |
| 5,802,361 A | 9/1998 | Wang et al. | |
| 5,857,064 A | 1/1999 | deSilva | |
| 5,893,908 A | 4/1999 | Cullen et al. | |
| 5,899,999 A | 5/1999 | De Bonet | |
| 5,924,096 A * | 7/1999 | Draper et al. | 707/10 |
| 5,933,823 A | 8/1999 | Cullen et al. | |
| 5,956,422 A | 9/1999 | Alam | |
| 5,970,216 A | 10/1999 | Tanio et al. | |
| 5,978,477 A | 11/1999 | Hull et al. | |
| 5,983,237 A | 11/1999 | Jain et al. | |
| 5,987,456 A | 11/1999 | Ravela et al. | |
| 6,003,069 A | 12/1999 | Cavill | |
| 6,006,226 A | 12/1999 | Cullen et al. | |
| 6,020,970 A | 2/2000 | Erickson et al. | |
| 6,031,623 A | 2/2000 | Smith et al. | |
| 6,038,309 A | 3/2000 | Ram et al. | |
| 6,072,904 A | 6/2000 | Desai et al. | |
| 6,147,767 A | 11/2000 | Petteruti et al. | |
| 6,152,369 A | 11/2000 | Wilz, Sr. et al. | |
| 6,199,073 B1 | 3/2001 | Peairs et al. | |

OTHER PUBLICATIONS

Chrom Merge 1.6 Addendum, New Features in Chrom Merge 1.6, 1995, pp. 1-4.

Adobe Acrobat "Classroom in a Book" (007144-7445).

Design Interactive Documents with Adobe and Acrobat Pro (007455-7897).

Product Information for MetaViewer Print Capture (SSI 009707-009709).

Product Information for Metafile—The Content Database (SSI 009710-009714).

Product Information for Metafile Information Retrieval (SSI 009715-SSI009722).

Product Information for The Metafile Warehouse, available at http://mv.metafile.com/warehouse.shtml. (SSI 009723-009730).

Product Information for MetaViewer ENTERPRISE™ Document Imaging (SSI 009731-009736).

Company Information for Metafile Information Systems, Inc., available at http://mv.metafile.com. (SSI009737).

Article—"Metafile Adds Internet Client Interface", available at http://esi.com/midrange/archives/article.asp?ID=8139824750PN. (Aug. 17, 1998), (SSI 009738).

"Turbochrom Results Manager User's Guide", Desktop Data Systems, Perkin Elmer, (May 1994), (SS 002334-002537).

User's Guide, "Microsoft Windows & MS-DOS 6 Operating Systems Plus Enhanced Tools For Sale Only With a New PC", (SSI 002122-002127).

"Important Dates in Microsoft's History", Dave & Sarah Computing, http://davesworld.click2site.com/ms_history.htm, (Sep. 21, 2001), (SSI 002128-002130).

"About Windows 95 Printer Drivers", Chapter 1: Printer Driver Overview, (SSI 002131-002257).

"Introduction to Virtual Devices", Chapter 1: Virtual Devices, (SSI 002258-002333).

"Why settle for data management when you can have Knowledge Engineering?", Scientific Software, Inc., (SSI 002565-2567).

O'Dea, Kathleen; "Software Manages Your Lab's Data", Techn Report Drug Discovery & Development, www.dddmag.com, (Jun./Jul. 2000) (SSI 002568-2569).

"Software Manages Your Lab's Data", R&D Software for Scientists, www.rdman.com, (Jun. 2000) (SSI 002570-2573).

"Turning Information Into Knowledge . . . Anytime, Anywhere.", CyberLAB, (SSI 002580-002587).

"Data . . . Anywhere, Anytime", CyberLab, (SSI 002588-002589).

"Information . . . Anywhere, Anytime", CyberLab, (SSI 002590-002591).

"Why settle for data management . . . ", Scientific Software Inc., (SSI 002592-002593).

"Information . . . Anywhere, Anytime", CyberLab, (SSI 002574-002579).

"Harness Your Data Monster.", CyberLab Information . . . Anywhere, Anytime., www.scisw.com (SSI 002596-002597).

"Introducing . . . CyberLAB!", CyberLAB, Seminar Agenda, (SSI 002598-002599).

"The World's First Web-based Knowledge Management System.", CyberLAB, (SSI 002600-002603).

"Intranet-Based Data Manager", Scientific Software, Inc., Press Release, (SSI 002604-002613).

Article—"Internet Alters Imaging Picture", available at http://www.govtech.net/magazine/gt/nov/nov1996-imaging/nov1996-imaging.phtml (Nov. 1996). (SSI 009739-009742).

Product Information for PrintStore Capture (SSI 009743).

Product Data Sheet for MetaViewer Enterprise (V5.0, May 2000) (SSI 009744-009747).

Product Data Sheet for MetaViewer Remote Client (May 2000) (SSI 009748-009749).

Product Data Sheet for MetaViewer (V8.3, Dec. 2000) (SSI 009750-009753).

Article—"Companies Rush to COLD at a Feverish Pitch", available at 4http://www.transformmag.com/db_area/archs/1996/November/4_1300.htm (Nov. 1996). (SSI 009754-009767).

Article—"Image Management Brings Order to the Chaos", available at http://www.transformmag.com/db_area/archs/1998/May/4_1081.htm (May 1998) (SSI 009768-009774).

Product Information for ArcItUp by BroadGun Software, available at http://broadgun.com/arcit/index.htm (2000) (SSI 009775-009779).

Product Information for FinePrint, available at http://www.fineprint.com/software/fineprint/standard/index.html. (SSI 009787-009788).
Article—"COLD Part II Brawny Systems Add Brains", available at http://www.transformmag.com/db_area/archs/1998/July/COLD_Part_4_1403.htm (Jul. 1998) (SSI 009780-009786).
Imaging Magazine's Holiday Shopper's Showcase (Dec. 1995) (SSI 009789-009797) [what is this?].
EKCO Group Information (Press relase??) (Jun. 1996) (SSI 009798-009799).
Article—"Booths to Aim for at AIIM", available at www.transformmag.com (Mar. 1997). (SSI 009800-009806).
Document—"Make Images Accessible on an Intranet" (Nov. 1997) (SSI 009807-009810) [what is this and where did it come from?].
Article—"50 Must see Products at AIMM", available at http://www.transformmag.com/db_area/archs/1998/May/4_1076.htm (May 1998) (SSI 009811-009826).
Document—"Imaging and Document Solutions" (Jun. 1999) (SSI 009827-009832).
Talk, News, Upgrades & New Products from TAL Technologies, vol. 4, No. 1, Fall 1996.
Product Description of Software Wedge of TAL Technologies, 1996.
Product Offering from Tools and Techniques, Data Junction for Windows, Cambio for Windows and DJXL 1997.
Product Offering from Tools and Techniques, New Data Conversion Solutions from T&T, 1997.
Description of Documentum WorkSpace, Robust Functionality for Document Coordinators, mid 1996.
Description of Documentum Enterprise Document Management System, A Strategic Infrastructure for Knowledge Chain Solutions, mid 1996.
Monarch for Windows 2.0 [on-line]. Monarch Home Page, Datawatch, late 1996. Retrieved from the internet http://www.datawatch.com/monarch.shtml.
American Laboratory, "Incorporating Chromatograms into Electronic Documents," Oct. 1996, Tom Jupille, Kari Hallenburg, and Bob Albrecht, pp. 19-22.
Chrom Merge, Insert Chromatograms into Windows Applications, User Manual, LC Resources, Inc. 1995.
Chrom Merge Advertisement, LC Resources, Inc. 1995.
Resources for Chromatography, Spring 1997.
Resources for Chromatography, Fall 1996.
"Docu Vault Archive," www.cypressdelivers.com, 2000.
"Information Systems Offers Integrated Document, Output Management," PCWEEK Online, May 28, 1998.
Output Management: It's More Than Just Managing Printers, www.cypressdelivers.com, 1998.
"Managing and Delivering Knowledge in Spit of Disparity", Cypress Corp. White Paper, www.cypressdelivers.com, 1998.
"Cypress Web Challenges Acrobat for Enterprise Archiving Searches, Retrieval" www.interex.org, 2000.
"Information Systems offers integrated document, output management," www.zdnet.com, May 28, 1998.
OS/2, 2.0 Presentation Manager Graphics Programming Guide, XP00210699-IBM Corp., pp. 18-1-18-8, 1992.
"General Scheme to Capture Window Objects for Reuse," IBM Technical Disclosure Bulletin, vol. 38, No. 10, Oct. 1995.
Petzold, "Environments-Metafile Support Under The OS 2 Graphics Programming Interface," PC Magazine, pp. 459, 460, 462-465, Sep. 25, 1990.
Complaint dated Jul. 11, 2001.
Civil Cover Sheet dated Jul. 11, 2001.
Category Form.
Report on Filing or Determination of Action Re Patent/Trademark dated Jul. 11, 2001.
Summons in a Civil Case.
Acceptance of Service of Process dated Jul. 27, 2001.
Motion for Admission Pro Hac Vice dated Aug. 10, 2001.
Notice of Action by Court-13 Endorsed Order Entered Granting [2-1] Motion for William F. Abrams, Kristine L. Ching and Chang H. Kim to Appear Pro Hac Vice—"Motion ALLOWED by the Court" dated Aug. 13, 2001.
Defendant Scientific Software, Inc.'s Answer to Complaint and Counterclaims dated Aug. 15, 2001.

NuGenesis Technologies Corporation's Response to Scientific Software, Inc.'s Counterclaims dated Sep. 17, 2001.
Stipulation and [Proposed] Order Re Timing of Discovery dated Sep. 17, 2001.
Affidavit of Michael E. McGuinness (filed with the Court on Oct. 2, 2001) dated Sep. 30, 2001.
NuGenesis Technologies Corporation's Motion for a Preliminary Injunction dated Oct. 2, 2001.
Memorandum in Support of NuGenesis Technologies Corporation's Motion for a Preliminary Injunction dated Oct. 2, 2001.
Joint Motion for Order for Expedited Discovery and Extension of Time of Scientific Software, Inc. to File Opposition to Preliminary Injunction Motion (Kristine L. Ching's signature only) dated Oct. 12, 2001.
Joint Motion for Order for Expedited Discovery and Extension of Time for Scientific Software, Inc. to File Opposition to Preliminary Injunction Motion (Kristine L. Ching and Anastasia Fernands signature) dated Oct. 15, 2001.
Defendant/Counterclaim Scientific Software, Inc.'s Initial Disclosures Pursuant to Federal Rule of Civil Procedure 26(a) dated Oct. 16, 2001.
Initial Disclosures of NuGenesis Technologies Corporation dated Oct. 16, 2001.
NuGenesis Technologies Corporation's First Set of Interrogatories to Scientific Software, Inc. dated Oct. 19, 2001.
NuGenesis Technologies Corporation's First Set of Requests for Production of Documents to Scientifc, Inc. dated Oct. 19, 2001.
Defendant/Counterclaimant Scientific Software, Inc.'s First Set of Interrogatories to Plaintiff/Counterdefendant NuGenesis Technologies Corporation dated Oct. 19, 2001.
Defendant and Counterclaimant Scientific Software, Inc.'s First Set of Requests for production to Plaintiff and Counterdefendant NuGenesis Technologies Corporation dated Oct. 19, 2001.
Joint Motion for Protective Order dated Oct. 21, 2001.
Confidentiality Stipulation and Protective Order (Order signed on Dec. 27, 2001) dated Oct. 22, 2001.
Scientific Software, Inc.'s Memorandum in Support of Order for Expedited Discovery and Extension of Time to File Opposition to Preliminary Injunction Motion dated Oct. 25, 2001.
NuGenesis Technologies Corporation's Response to Scientific Software, Inc.'s Memorandum in Support of Order for Expedited Discovery and Extension of Time to File Opposition to Preliminary Injunction Motion dated Oct. 30, 2001.
Scientific Software, Inc.'s Response to NuGenesis First Set of Document Requests dated Nov. 12, 2001.
Defendant/Counterclaimant Scientific Software, Inc.'s Responses to NuGenesis First Set of Interrogatories dated Nov. 12, 2001.
NuGenesis Technologies Corporation's Response to Defendant/Counterclaimant Scientific Software, Inc.'s First Set of Interrogataories dated Nov. 12, 2001.
NuGenesis Technologies Corporation's Response to Defendant and Counterclaimant Scientific Software, Inc.'s First Set of Requests for Production dated Nov. 12, 2001.
Defendant/Counterclaimant Scientific Software, Inc.'s Supplemental Responses to NuGenesis First Set of Interrogatories dated Nov. 16, 2001.
NuGenesis Technologies Corporation's Notice of Deposition—30(b)(6) of Scientific Software, Inc. on Tuesday, Dec. 18, 2001 at 10:00 a.m. dated Nov. 21, 2001.
NuGenesis Technologies Corporation's Notice of Deposition—30(b)(6) of Scientific, Inc. on Wednesday, Dec. 19, 2001 at 10:00 a.m. dated Nov. 21, 2001.
NuGenesis Technologies Corporation's Notice of Deposition—Soheil Saadat, Scientific Software, Inc. on Thursday, Dec. 20, 2001 at 10:00 a.m. dated Nov. 21, 2001.
Defendant/Counterclaimant Scientific Software, Inc.'s First Notice of 30(b)(6) Deposition of Plaintiff/Counterdefendant NuGenesis Technologies Corporation dated Nov. 21, 2001.
Scientific Software, Inc.'s Notice of Deposition of Ajit Nagral on Dec. 14, 2001 at 9:00 a.m. dated Dec. 7, 2001.
Scientific Software, Inc.'s Notice of Deposition of Donald Muirhead on Dec. 17, 2001 at 4:00 p.m. dated Dec. 7, 2001.

Scientific Software, Inc.'s Notice of Deposition of Michael McGuinness on Monday, Jan. 7, 2002 at 9:00 a.m. dated Dec. 7, 2001.

Scientific Software, Inc.'s Notice of Deposition of Fitzhugh Bush on Tuesday, Jan. 8, 2002 at 9:00 a.m. dated Dec. 7, 2001.

Scientific Software, Inc.'s Notice of Deposition of Gregory Murphy on Wednesday, Jan. 9, 2002 at 9:00 a.m. dated Dec. 7, 2001.

Scientific Software, Inc.'s Motion for Admission Pro Hac Vice dated Dec. 18, 2001.

Notice of Action by the Court—Judge Nathaniel M. Gorton. Endorsed Order Entered Granting [14-1] Motion for Mark J. Danielson to Appear Pro Hac Vice, Fee Status: Paid Fee Amt: $50.00, Receipt#: 403637 Addes Mark J. Danielson. "Motion ALLOWED" [EOD Date Dec. 27, 2001] dated Dec. 27, 2001.

Notice of Action by the Court—Judge Nathaniel M. Gorton. Endorsed Order Entered Granting [6-1] Stipulation Motion re: Timing of Discovery. "Done and Ordered This Dec. 27, 2001" cc/cl [EOD Date Jan. 2, 2002] dated Dec. 27, 2001.

Notice of Action by the Court—Judge Nathaniel M. Gorton. Endorsed Order Entered Granting [10-1] Joint Motion for Expedited Discovery, Granting [10-2] Joint Motion to Extend Time to File Opposition. "Motion ALLOWED" cc/cl [EOD Date Jan. 2, 2002] dated Jan. 2, 2002.

Certificate of Agreement to be Bounced by Confidentiality Stipulation and Protective Order dated Jan. 16, 2002.

Assented to Motion for Leave to File Opposition Memorandum in Excess of Twenty Pages datd Jan. 18, 2002.

Request for Oral Argument dated Jan. 18, 2002.

Defendant and Counterclaimant Scientific Software, Inc.'s Objections to Affidavit of Michael E. McGuinness Submitted in Support of NuGenesis Technologies Corporation's Motion for Preliminary Injunction dated Jan. 18, 2002.

Defendant and Counterclaimant Scientific Software, Inc.'s Memorandum in Opposition to NuGenesis Technologies Corporation's Motion for Preliminary Injunction dated Jan. 18, 2002.

Declaration of Michael H. Elliott in Support of Scientific Software, Inc.'s Opposition to NuGenesis Technologies Corporation's Motion for Preliminary Injunction dated Jan. 18, 2002.

Declaration of Soheil Saadat in Support of Scientific Software, Inc.'s Opposition to NuGenesis Technologies Corporation's Motion for Preliminary Injunction dated Jan. 18, 2002.

NuGenesis Technologies Corporation's Unopposed Motion to File Under Seal dated Feb. 1, 2002.

NuGenesis Technologies Corporation's Unopposed Motion for Leave to File Reply dated Feb. 1, 2002.

NuGenesis Technologies Corporation's Unopposed Motion to File Memorandum in Excess of Twenty Pages dated Feb. 1, 2002.

NuGenesis Technologies Corporation's Reply to Scientifice Software, Inc.'s Memorandum in Opposition to NuGenesis Technologies Corporation's Motion for a Preliminary Injunction dated Feb. 1, 2002.

Plaintiff's Response to Defendant's Objections to Affidavit of Michael E. McGuninness dated Feb. 1, 2002.

Affidavit of Edward Lawrence Bayiates dated Feb. 1, 2002.

Affidavit of Carey Gregory dated Feb. 1, 2002.

Affidavit of Carl Philip Emmanuel Dos Santos dated Feb. 1, 2002.

Affidavit of Gregory P. Murphy dated Feb. 1, 2002.

Affidavit of Ajit S. Nagral dated Feb. 1, 2002.

Affidavit of Anastasia M. Femands dated Feb. 1, 2002.

Defendant and Counterclaimant Scientific Software, Inc.'s Motion for Summary Judgment dated Feb. 13, 2002.

Memorandum of Law in Support of Defendant and Counterclaimant Scientific Software, Inc.'s Motion for Summary Judgment dated Feb. 13, 2002.

Scientific Software, Inc.'s Unopposed Motion to File Under Seal dated Feb. 13, 2002.

Request for Oral Argument and Consolidated Consideration dated Feb. 13, 2002.

Statement of Undisputed Facts in Support of Defendant and Counterclaimant Scientific Software, Inc.'s Motion for Summary Judgment dated Feb. 13, 2002.

Declaration of Soheil Saadat in Support of Scientific Software, Inc.'s Motion for Summary Judgment dated Feb. 13, 2002.

NuGenesis Technologies Corporation's Response to Defendant's Request for Consolidated Consideration dated Feb. 21, 2002.

Assented to Motion to Extend Time to File an Opposition to Scientific Software, Inc.'s Motion for Summary Judgment dated Feb. 21, 2002.

Notice of Action by the Court—Judge Nathaniel M. Gorton. Endorsed Order Entered Granting [33-1] Motion to Extend Time of Mar. 13, 2002 to Respond to Motion for Summary Judgment, Response to Motion Reset to Mar. 31, 2002 for [27-1] Motion for Summary Judgment dated Feb. 26, 2002.

Assented to Motion for Additional Extension of Time to File an Opposition to Scientific Software, Inc.'s Motion for Summary Judgment dated Mar. 8, 2002.

Notice of Action by the Court—Judge Nathaniel M. Gorton. Endorsed Order Entered Granting [34-1] Motion to Extend Time to Mar. 20, 2002 to File Opposition dated Mar. 13, 2002.

Affidavit of Gill Andrews Pratt dated Mar. 14, 2002.

Affidavit of Ajit S. Nagral dated Mar. 19, 2002.

NuGenesis Technologies Corporation's Cross-Motion for Summary Judgment of Infringement dated Mar. 20, 2002.

NuGenesis Technologies Corporation's Memorandum in Opposition to Scientific Software, Inc.'s Motion for Summary Judgment and in Support of NuGenesis's Cross Motion for Partial Summary Judgment of Infringement dated Mar. 20, 2002.

NuGenesis Technologies Corporation's Unopposed Motion to File Memorandum in Excess of Twenty Pages dated Mar. 20, 2002.

NuGenesis Technologies Corporation's Unopposed Motion to File Under Seal dated Mar. 20, 2002.

NuGenesis Technologies Corporation's Response to the Statement of Undisputed Facts in Support of Defendant and Counterclaimant Scientific Software, Inc.'s Motion for Summary Judgment and Statement of Additional Material Facts dated Mar. 20, 2002.

Assented-to Motion to Extend Time to File an Opposition to NuGenesis Technologies Corporation's Cross-Motion for Summary Judgment dated Apr. 3, 2002.

Assented-to Motion to Extend Time to File an Opposition to NuGenesis Technologies Corporation's Cross-Motion for Summary Judgment—Motion Allowed by Court on Apr. 8, 2002 dated Apr. 10, 2002.

Notice of Appearance—Denise Marie Barton dated Apr. 17, 2002.

Assented-to Motion for Leave to File Opposition Memorandum in Excess of Twenty Pages dated Apr. 17, 2002.

Defendant and Counterclaim Scientific Software, Inc.'s Memorandum in Opposition to NuGenesis Technologies Corporation's Cross-Motion for Summary Judgment dated Apr. 17, 2002.

Response to NuGenesis Technology Corporation's Statement of Additional Material Facts dated Apr. 17, 2002.

Declaration of Chang H. Kim in Support of Scientific Software, Inc.'s Opposition to NuGenesis Technologies Corporation's Cross-Motion for Summary Judgment dated Apr. 17, 2002.

Declaration of Soheil Saadat in Support of Scientific Software, Inc.'s Opposition to NuGenesis Technologies Corp.'s Cross-Motion for Summary Judgment dated Apr. 17, 2002.

Assented-to Motion for Leave to Withdraw From Case dated Apr. 24, 2002.

Notice of Action by the Court—Judge Nathaniel M. Gorton. Endorsed Order entered granting [20-1] motion to leave to File Memorandum in excess of 20 pages. "Motion Allowed" dated Apr. 30, 2002.

Notice of Action by the Court—Judge Nathaniel M. Gorton. Endorsed Order entered granting [22-1] motion for leave to file reply. "Motion Allowed" dated Apr. 30, 2002.

Notice of Action by the Court—Judge Nathaniel M. Gorton. Endorsed Order entered granting [23-1 ] motion for leave to file Memorandum in excess of 20 pages. "Motion Allowed" dated Apr. 30, 2002.

Notice of Action by the Court—Judge Nathaniel M. Gorton. Endorsed Order entered granting [26-1 ] motion to seal/impound. "Motion Allowed" dated Apr. 30, 2002.

Notice of Action by the Court—Judge Nathaniel M. Gorton. Endorsed Order entered granting [28-1] motion to seal/impound dated Apr. 30, 2002.

Notice of Action by the Court—Judge Nathaniel M. Gorton. Endorsed Order entered granting [36-1] motion for leave to file Memorandum in excess of 20 pages. "Motion Allowed" dated Apr. 30, 2002.

Notice of Action by the Court—Judge Nathaniel M. Gorton. Endorsed Order entered granting [39-1] motion to seal/impound. "Motion Allowed" dated Apr. 30, 2002.

Notice of Action by the Court—Judge Nathaniel M. Gorton. Endorsed Order entered granting [42-1] motion for leave to file Memorandum in excess of 20 pages. "Motion Allowed" dated Apr. 30, 2002.

Assented-to Motion for Leave to Withdraw from Case—Motion Allowed by the Court dated Apr. 30, 2002.

NuGenesis Technologies Corporation's Motion for Leave to File Reply dated May 6, 2002.

NuGenesis Technologies Corporation's Motion to File Under Seal dated May 6, 2002.

Affidavit of Anastasia M. Femands dated May 6, 2002.

NuGenesis Technologies Corporation's Request for Hearing dated May 6, 2002.

Notice of Appearance—Donald W. Muirhead dated May 9, 2002.

Notice of Scheduling Conference dated Jun. 4, 2002.

Notice of Motion hearing—Motions for Summary Judgment and Motion for Preliminary Injunction dated Jun. 4, 2002.

Motion for Leave to Bring Electronic Equipment into the Courthouse dated Jul. 18, 2002.

Notice granting 64-1 motion for leave to bring electronic equipment into the courthouse dated Jul. 23, 2002.

Local Rule 16.1 Joint Statement dated Jul. 24, 2002.

Rule 16.1(D)(3) Certification dated Jul. 24, 2002.

Plaintiffs Local Rule 16.1(D)(3) Certification dated Jul. 24, 2002.

Counter-Motion for Leave to Bring Electronic Equipment into the Courthouse dated Jul. 29, 2002.

NuGenesis Technologies Corporation's Opposition to Scientific Software, Inc.'s Counter-Motion for Leave to Bring Electronic Equipment into the Courthouse dated Jul. 30, 2002.

Memorandum and Order dated Sep. 9, 2002.

NuGenesis Technologies Second Set of Interrogatories to Scientific Software, Inc. dated Oct. 4, 2002.

NuGenesis Technologies Second Set of Requests for Production of Documents to Scientific Software, Inc. dated Oct. 4, 2002.

Declaration of Chang H. Kim in Support of Scientific Software, Inc's Opposition to Nugenesis Technologies Corporation's Motion for Preliminary Injunction.

Preliminary Amendment dated Jan. 19, 2001.

American Pharmaceutical Review—The Quarterly Review of American Pharmaceutical Business & Technology (vol. 3, Issue 2, Summer 2000).

Methods and Apparartus for Storing, Retrieving and Manipulating Data Produced by Different Windows 3.1, Windows 95 and Windows NT Application Programs by Mantra Software Corp., et al.

Affidavit of Ajit S. Nagral.

Functional Specification for LabTALK V1.0 by Fitz Bush.

Copy of postcard regarding application filed on Feb. 4, 1998 entitled Methods and Apparatus for Storing, Retrieving and Manipulating Data Produced by Different Windows 3.1, Windows 95 and Windows NT Application Programs by Nagral, et al.

Letter to Mark J. Danielson, Esq. dated Dec. 28, 2001 by Anastasia M. Fernands.

Functional Specification for NuGenesis VI.I dated Jun. 9, 1998 by Fitz Bush.

Mantra Software Meeting Memo dated Nov. 14, 1997 regarding new requirements for first release.

San Jose Demo and Pfizer Demo dated Oct. 16, 1997.

Purchase Order from Pfizer Inc. to Mantra Software Corp. dated Dec. 16, 1997.

Invoice from Mantra Software Corporation to Pfizer Inc. dated Jun. 4, 1998.

Mantra Software Employee Travel Report for week ended Oct. 18, 1997 by Greg Murphy.

Letter to Anastasia M. Fernands, Esq. dated Dec. 7, 2001 from Mark J. Danielson.

Invoice from Mantra Software Corporation dated Jan. 13, 1999 to Computerised Information Technology LTD.

Request for Refund dated Apr. 15, 1999.

Issue Fee Transmittal dated Apr. 17, 2001.

Nugenesis Technologies Customer Base Expands 50%.

Quotation No. 53 from Mantra Software Corporation to Pfizer/Paul Aldridge dated Nov. 24, 1997.

Copy of Attorney Advisor (Melvin T. Axilbund) regarding abandonment dated Mar. 30, 1999.

U.S. Department of Commerce Patent and Trademark Office Fee Record Sheet regarding Trademark Application Ser. No. 75390271 dated Dec. 2, 1997.

Mantra Software Corporation Bay Area Investors Meeting Agenda, Silicon Valley Capital Club, San Jose, CA dated Jan. 15, 1998.

Deposition of Michael E. McGuinness dated Jan. 7, 2002, vol. 1, pp. 1-220.

Deposition of Donald W. Muirhead dated Dec. 17, 2001, vol. 1, pp. 1-73.

Deposition of Ajit Nagral dated Dec. 14, 2001, vol. 1, pp. 1-176.

Deposition of Gregory P. Murphy, dated Jan. 9, 2002, vol. 1, pp. 1-89; Deposition of Fitzhugh Bush, III dated Jan. 8, 2002, vol. 1, pp. 1-168.

Nugenesis Technologies Corporation's Response to Scientific Software, Inc.'s Counterclaims.

TH. Irlbeck: "Computer-Lexikon", Deutscher Taschenbuch Verlag, 1998 pp. 865 f.

Domino for iSeries 400: Integrating Spool File and Fax Data.

Information Technology Association of America (ITAA) Press Release, IBM AS/400 Division Gains First ITAA*2000 Certification, Oct. 1, 1996.

Michael P. Deignan: "Monarch, Turn Printed Reports into Data Sources", Windows & .NET Magazine Network, Instant Doc#197, Sep. 1997.

DATAWATCH, Monarch General FAQ.

L.M. Haas et al.: "Transforming Heterogeneous Data with Database Middleware: Beyond Integration", Bulletin of the IEEE Computer Society Technical Committe on Data Engineering, 1997, pp. 1-6.

M. Ricciuti: "Oracle bets on the Net with 8i", CNET News.com, Sep. 14, 1998.

* cited by examiner

|     | Field name | Field type (Acess) | Field type (Oracle) | Description |
| --- | --- | --- | --- | --- |
| 1 | LTId | Integer | Integer | Report Id. Unique in this table. |
| 2 | LTVerson | Integer | Integer | Version of schema when record was inserted. |
| 3 | LTPrtDesc | Varchar(50) | Varchar(50) | Project description. |
| 4 | LTRepNme | Varchar(30) | Varchar(30) | Report name. |
| 5 | LTRepId | Varchar(150) | Varchar(150) | Report Id. |
| 6 | LTBtchId | Varchar(30) | Varchar(30) | Batch Id. |
| 7 | LTUsrNme | Varchar(30) | Varchar(30) | User name. |
| 8 | LTUsrCmnt | Varchar(254) | Varchar(254) | User comment. |
| 9 | LTPrtDat | Varchar(30) | Varchar(30) | Print date. |
| 10 | LTPrtTim | Varchar(30) | Varchar(30) | Print time. |
| 11 | LTPrtApp | Varchar(50) | Varchar(50) | Printing application name. |
| 12 | LTMachNme | Varchar(50) | Varchar(50) | Machine name. |
| 13 | LTDomnNme | Varchar(50) | Varchar(50) | Domain or Workgroup name. |
| 14 | LTLognNme | Varchar(50) | Varchar(50) | Login name. |
| 15 | LTXExtnt | Integer | Integer | X Extent of Pages in report. |
| 16 | LTYExtnt | Integer | Integer | Y Extent of Pages in report. |
| 17 | LTNumOfPg | Integer | Integer | Number of pages in the report. If this field is blank, the number is computed for the LTId from LT Page table. |
| 18 | LTCRC32 | Integer | Integer | CRC of tags & numeric data in the record. If the CRC doesn't match, it indicates tampering of some field in the record. |

Fig. 3

| | Field name | Field type (Access) | Field type (Oracle) | Description |
|---|---|---|---|---|
| 1 | LTId | Integer | Integer | Report Id. |
| 2 | LTPgNum | Integer | Integer | Page number. |
| 3 | LTMFRNum | Integer | Integer | Metafile record number. LTId, LTPgNum and LTMFRNum together constitute a unique record. |
| 4 | LTMFBfTy | Integer | Integer | Metafile buffer type. Tells the type metafile stored - regular, enhanced, base-64 encoded, etc. |
| 5 | LTMFBfLn | Integer | Integer | Length of data in LTMFBufr field. |
| 6 | LTMFBufr | Memo | Long | Metafile record stored in max. 16K chunks. |

Fig. 5

| Field name | Field type (Access) | Field type (Oracle) | Description |
|---|---|---|---|
| LTLastId | Integer | Integer | The last LTId inserted in LT_Main. The value is not decremented if a record is deleted. The value is changed reset to 0 if all the records are deleted (to allow the new entries to start from 1). The max value is 4,294,967,295. |
| 1 | | | |

Fig. 6

INFORMATION STORAGE AND RETRIEVAL SYSTEM FOR STORING AND RETRIEVING THE VISUAL FORM OF INFORMATION FROM AN APPLICATION IN A DATABASE

CROSS-REFERENCE TO RELATED APPLICATION

This application is a continuation of U.S. patent application Ser. No. 09/213,019 filed on Dec. 16, 1998 now U.S. Pat. No. 6,260,044 which is based on U.S. provisional patent application No. 60/073,741, filed Feb. 4, 1998.

BACKGROUND

Computer programs generally maintain data in a variety of formats. There usually is one format that is unique, and typically proprietary, to each computer program in which raw data are stored persistently. This format usually is designed to reduce the amount of information actually stored and, in some cases, to restrict the ability of a third party to access the data. Data in this format generally are created by a "save" function of the computer program. The save function formats the raw data and stores the formatted raw data in yet another format, called a "file," that is defined by the operating system for which the computer program is designed. Data that are being processed by a computer program are stored in another format, also typically proprietary, called a "data structure," which generally is stored in volatile or working memory during execution of the computer program. A data structure usually is designed to permit the data to be processed efficiently by the computer program, while minimizing the amount of memory needed to represent the data.

With many computer programs, the most useful form of the data from the perspective of the user is its visual form, e.g., what is displayed on a computer display or what is printed. However, this form of the data often is not captured into permanent or persistent storage, unless it is printed and the printed form is electronically scanned. In particular, the file format used by a computer program often does not maintain data in a visual form for several reasons. The visual form of the data generally requires more information to be represented and can be reconstructed from raw data that require less information to be represented. Therefore the need to store the visual form of the data is generally considered unnecessary.

Part of the visual form of data produced by a computer program is generated, for example, from environmental data (such as the date and time) or user selected data that are being processed, and is not recoverable from the file format, but only from the data structures of the computer program. Although some data structures represent the visual form of the data, often there is no mechanism to retain the visual form of the data other than by printing. Some operating systems permit displayed data to be copied from one computer program to another using a "cut-and-paste" operation, but this operation generally requires the other computer program to be in operation on the same machine. Some computer programs also do not have these operations available to the user. For some computer programs, the printed form of the data, not the displayed data, is most useful and this operation does not provide access to the printed data.

Even if the visual form of data from a computer program were stored, as new versions of the computer program are used, or if the computer program is no longer available, access to that data is impeded. Also, another computer program still might not be able to access the data if the data are stored in a proprietary format.

This lack of access to the visual form of the data from a computer program creates a variety of problems when this form of the data is desired for creating compound documents from multiple sources of data, particularly if the data are created, used and shared over a period of time by multiple different users with multiple different computer programs that are dispersed geographically. As a particular example, in the pharmaceutical industry, data may be acquired from many laboratory instruments in geographically dispersed laboratories over a significant period of time, and then may be combined to produce reports, for example, for regulatory compliance. The inability to centrally access an electronic visual form of the data from these instruments adds a significant cost to regulatory compliance.

Electronically scanning printed documents to provide shared electronic access to such documents has several disadvantages. First, scanning consumes significant resources, including time and effort of personnel. Second, a significant time delay between the creation of a document and its availability to others may occur. Third, bit mapped images created by scanning become distorted when scaled, rotated or otherwise transformed. Fourth, in order for text to be searchable in a scanned document, the scanned document must be processed by optical character recognition (OCR) software.

Another problem that may be encountered with data storage is that data integrity may be compromised, either intentionally or accidentally, between the time when the data are stored and the time when the data are used. If the data are being used to obtain regulatory or administrative approval, some assurance of the integrity of the data may be required.

SUMMARY

The visual form of data may be received from a computer program and may be stored in a database. The visual form of the data may be received, for example, in response to a print operation by the computer program or by some other operation such as a cut and paste sequence of operations or by sending the data to another application. The visual form of the data may be stored as a vector image that permits scalability. The visual form of the data may be stored with other identifying information or tags in the database to facilitate searching of the database. The data in the database may be encoded in a manner that ensures data integrity and that permits detection of when data has been compromised. In one embodiment, a service layer application is provided to control access to the database by performing encoding and decoding of the data in the database. The service layer may have an application programming interface that permits many applications to have access to the database. Another application may be provided for accessing the visual form of the data from the database and for providing this data to another computer program. Such an application permits a user to create compound documents from data in the database using the other computer program.

Accordingly, the following represent some of the aspects of the invention, either alone or in any combination together. The various aspects of the invention may be as a computer-implemented process, computer system or a computer program product with computer-readable code encoded on a tangible information recording or transmission medium. Yet further aspects of the invention will be apparent from the following detailed description of an example implementation, and modifications thereto.

In one aspect, the visual form of information is captured from an application executed on a computer into a database. The visual form of the data is received from the application. Tags corresponding to the visual form of the data also are received. The visual form of the data as a vector image and the tags are stored into the database.

In another aspect, the database which stores the visual form of data from an application executed on a computer may include a first table for storing tags corresponding to the visual form of the data and a reference to the visual form of the data and a second table for storing the visual form of the data as a vector image with a reference to the visual form of the data.

In another aspect, a database in which visual form of data from applications executed on one or more computers are stored as vector images is accessed. The database may be searched to identify one or more vector images. The identified vector images are sorted according to tags associated with the identified vector images. A user is permitted to select one or more of the identified vector images, which are then displayed. The displayed vector images may be scaled and the scaled vector image is displayed. Text in the selected vector images also may be searched.

In another aspect, a selected portion of visual form of data may be sent from a first application to a second application. An indication of a selected area of the visual form of the data is received in the first application. An indication of the second application also is received. Keystrokes in the second application for pasting data into the second application are determined. Data representing the selected area of the visual form of the data are determined and transferred to a memory area from which the second application may paste data. The determined keystrokes are sent to the second application.

In another aspect, a visual form of text data is converted into character delimited text data for insertion into tabular structure. An indication of a selected area of the visual form of the data is received. Data representing the presence of text within the selected area along a horizontal extent for all rows of text is initialized. The initialized data is modified to indicate the presence of text within the selected area along the horizontal extent for all rows of text. Character delimited data is generated according to the text in the row and the column boundaries identified in the row.

In another aspect, text in a vector image including commands specifying text and horizontal and vertical coordinates for placement of the text is searched. The commands in the vector image are sorted according to the vertical coordinates, then the horizontal coordinates. A list structure representing an ordering of the text from the ordered commands is generated. The list structure may be a doubly linked list. The list structure may combine text strings close to one another so text can be located even though it may be split across multiple text records. The text in each selected metafile is processed into an ordered list so that words may be searched in the order that they appear within each metafile. Such ordering also permits any previous or next occurrences of a word or other character string to be identified in the metafile and among a set of metafiles. Documents from many different applications may be searched together using this technique.

In another aspect, access to a database is controlled by a service layer. In response to a request to store data in the database, the data is encoded and an error checking calculation is performed on the data. The encoded data and a result of the error checking calculation are stored in the database. In response to a request to read data from the database, the read data is decoded and an error checking calculation is performed on the read data. The result of the error checking calculation of the read data is compared with the stored result of the error checking calculation performed on the stored data to identify any discrepancy. The decoded read data and an indication of any discrepancy identified between the stored and read data is provided.

In another aspect, a database for stores the visual form of data with corresponding tags identifying the visual form of the data. Each of the plurality of computers executing the applications receives the visual form of the data from one of the plurality of different applications and tags corresponding to the visual form of the data. The visual form of the data as a vector image and the corresponding tags are stored into the database. An application on one of the plurality of computers accesses the tags and the visual form of the data from the database in response to queries on the database. Another application may be used to create documents including the visual form of data retrieved from the database, which may be stored into the database.

In another aspect, a vector image is processed to enable scaling of text in the vector image. Commands in the vector image corresponding to text are identified. Specified fonts in the identified commands may be changed to scalable fonts. Intercharacter spacing also may be added. Text rotations and scalings also may be modified.

In another aspect, compound documents may be created from the visual form of data from applications executed on a computer stored in a database. The visual form of information from the applications is captured into a database, by receiving the visual form of the data from the application, receiving tags corresponding to the visual form of the data, and storing the visual form of the data as a vector image and the tags into the database. The visual form of information from the applications is retrieved from the database. A compound document is created from the visual form of information retrieved from the database. The visual form of the compound document is captured into the database, by receiving the visual form of the compound document from the application, receiving tags corresponding to the visual form of the compound document, and storing the visual form of the compound document as a vector image and the tags into the database.

BRIEF DESCRIPTION OF THE DRAWINGS

In the drawings,

FIG. 3 is a schematic representation of a database table structure for the database;

FIG. 5 is a schematic representation of another database table structure for the database;

FIG. 6 is a schematic representation of another database table structure for the database;

DETAILED DESCRIPTION

Figure 1:
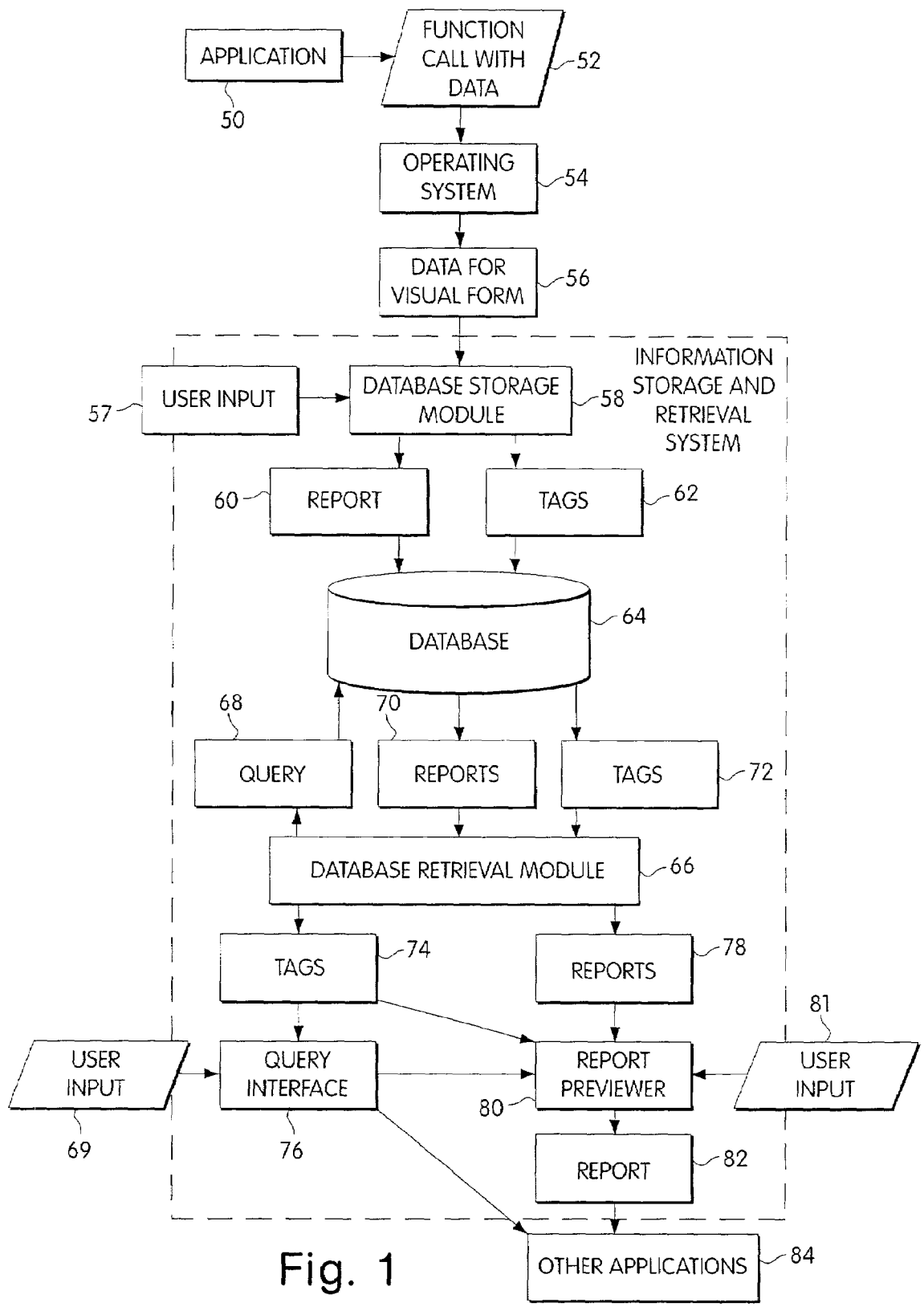
FIG. 1 is a block diagram illustrating an information storage and retrieval system for storing the visual form of data from an application into a database.

Many advantages may be obtained by receiving the visual form of data from a computer program and by storing it in a database. A visual form of data from an application or computer program is any image or portion thereof produced by the application or computer program from the data for display or printing. An image is any data that define a matrix of picture elements (pixels) that may be displayed or printed on any display or printing device. Each pixel generally is defined by data from either a grey scale or a color palette. A vector image is an image specified by drawing commands. Example shapes include lines, polygons, objects, and text. The drawing commands are interpreted with respect to a target display or printing device to generate values for a matrix of pixels. In general, vector images may be transformed, e.g., scaled, rotated or flipped. A bit map image is an image specified by a matrix values specifying each pixel of the image. A bit map image also is known as a raster image. A bit map image may be included within a vector image.

In general, most applications transform data to a visual form as either a vector image or a bit map image for display on a display device. Applications also use function calls to the operating system to print a visual form of the data. In response to these function calls, the operating system typically produces a vector image that is translated by a printer into a bit map image to control the printer.

Referring now to FIG. 1, an information storage and retrieval system that captures the visual form of data from an application into a database will now be described. In FIG. 1, an application 50 is executed on a general purpose computer and is used by a user to create information which has a visual form that may be displayed or printed. This visual form is captured into a database 64 in the information storage and retrieval system in a format defined by the operating system 54 of the general purpose computer. The application 50 makes function calls 52 to the operating system 54 which cause the operating system to create data 56 representing the visual form of the data. Such data 56 is generally in the form of a vector image. Such function calls generally are provided by the operating system 54 in order to permit applications such as application 50 to print data to a printer. The data 56 in turn is read by a database storage module 58 and is stored as a report 60 with tags 62 in the database 64. The tags 62 include identifying information for the report, such as described below in more detail, which may include information provided by user input 57.

By relying on the output from functions calls to the Windows operating system made by an application in the process of performing a common operation, such as printing, the database storage module need not be designed to handle proprietary data formats from multiple applications. In general, for any operating system, the output of an operation from an application to another application in a standard format, such as printing, can be captured and stored in a standard form in a database. Applications, such as application 50, need not be designed to handle communication with a database in order to store the visual form of data in a database.

After reports 60 are stored in the database, a database retrieval module 66 may access the database through queries 68 to retrieve one or more reports 70 and one or more tags 72. The database retrieval module 66 may be implemented to support any number of database management tasks, such as modifying, copying, moving, deleting, reading and otherwise manipulating the database records, as described in more detail below. A query interface 76 permits a user to input parameters for searching, sorting and filtering the reports in the database. Collections of tags associated with filtered or sorted reports are provided to the query interface 76 for review by the user. A selected report may be provided to a report previewer 80 or another application 84 through a command available through the query interface 76.

A report previewer 80 receives reports 78, and tags 74, through the database retrieval module 66 to display a report to the user. The report previewer, as described in more detail below, permits a user to provide input 81 to select a report or a portion of a report 82 to be transferred or sent to another application 84. Using this other application 84, a compound document may be compiled from many reports stored in and retrieved from the database. This compound document also may be stored in the database 64 in the same manner that application 50 stores data into the database.

The various components of the information storage and retrieval system such as shown in FIG. 1 may be implemented as a computer program using a general purpose computer system. Such a computer system typically includes a main unit connected to both an output device which displays information to a user and an input device which receives input from a user. The main unit generally includes a processor connected to a memory system via an interconnection mechanism. The input device and output device also are connected to the processor and memory system via the interconnection mechanism.

It should be understood that one or more output devices may be connected to the computer system. Example output devices include a cathode ray tube (CRT) display, liquid crystal displays (LCD) and other video output devices, printers, communication devices such as a modem, and storage devices such as disk or tape. It should also be understood that one or more input devices may be connected to the computer system. Example input devices include a keyboard, keypad, track ball, mouse, pen and tablet, communication device, and data input devices.

The computer system may be a general purpose computer system which is programmable using a computer programming language, such as "C++," Visual Basic, JAVA or other language, such as a scripting language or even assembly language. In a general purpose computer system, the processor is typically a commercially available processor, such as the series x86, Pentium and Cerelon processors, available from Intel, similar devices from AMD and Cyrix, the 680X0 series microprocessors available from Motorola, and the PowerPC microprocessor from IBM. Many other processors are available. Such a microprocessor executes a program called an operating system, of which WindowsNT, Windows95 or 98, UNIX, Linux, Solaris, OS/2, DOS, VMS, MacOS and OS8 are examples, which controls the execution of other computer programs and provides scheduling, debugging, input/output control, accounting, compilation, storage assignment, data management and memory management, and communication control and related services. The processor and operating system define a computer platform for which application programs in high-level programming languages are written.

A memory system typically includes a computer readable and writeable nonvolatile recording medium, of which a magnetic disk, a flash memory and tape are examples. The disk may be removable, known as a floppy disk, or permanent, known as a hard drive. A disk has a number of tracks in which signals are stored, typically in binary form, i.e., a form interpreted as a sequence of one and zeros. Such signals may define an application program to be executed by the microprocessor, or information stored on the disk to be processed by the application program. Typically, in operation, the processor causes data to be read from the nonvolatile recording medium into an integrated circuit memory element, which is typically a volatile, random access memory such as a dynamic random access memory (DRAM) or static memory (SRAM). The integrated circuit memory element allows for faster access to the information by the processor than does the disk. The processor generally manipulates the data within the integrated circuit memory and then copies the data to the disk when processing is completed. A variety of mechanisms are known for managing data movement between the disk and the integrated circuit memory element, and the invention is not limited thereto. It should also be understood that the invention is not limited to a particular memory system.

Such a system may be implemented in software or hardware or firmware, or a combination of the three. The various elements of the system, either individually or in combination may be implemented as a computer program product tangibly embodied in a machine-readable storage device for execution by a computer processor. Various steps of the process may be performed by a computer processor executing a program tangibly embodied on a computer-readable medium to perform functions by operating on input and generating output. Computer programming languages suitable for implementing such a system include procedural programming languages, object-oriented programming languages, and combinations of the two.

It should be understood that the invention is not limited to a particular computer platform, particular processor, or particular programming language. Additionally, the computer system may be a multiprocessor computer system or may include multiple computers connected over a computer network. It should be understood that the components shown in FIG. 1 and their subcomponents illustrated in the remaining figures may be separate modules of a computer program, or may be separate computer programs, which may be operable on separate computers. The data produced by these components may be stored in a memory system or transmitted between computer systems.

The system shown in FIG. 1 may be implemented using a computer network, such that the application 50, operating system 54 and database storage module 58 are executed on one computer, the database 64 is executed on another computer and the database retrieval module 66, report previewer 80 and the other application 84 are executed on yet another computer. There may be many computers with a database retrieval module 66, many computers with a database storage module 58 and many databases 64. One computer may have both a database retrieval module and a database storage module for use with its applications 50 and 84. One computer also may have the database retrieval module, the database storage module and the database along with the applications 50 and 84. The various possible configurations of computers in a network permit many users to create compound documents from multiple sources of data, even if the data is created, used and shared over a period of time by multiple different users with multiple different computer programs that are dispersed geographically.

The various modules of FIG. 1 will now be described in more detail. The applications 50 and 84 may be any applications that may be executed by the operating system 54 of the general purpose computer. Example kinds of applications include, but are not limited to, laboratory equipment control and data analysis programs, word processing programs, graphics programs and spreadsheet programs.

The database 64 may be any kind of database, including a relational database, object-oriented database, unstructured database or other database. Example relational databases include Oracle 8i from Oracle Corporation of Redwood City, Calif., Informix Dynamic Server from Informix Software, Inc. of Menlo Park, Calif., DB2 from International Business Machines of Yorktown Heights, N.Y., and Access from Microsoft Corporation of Redmond, Wash. An example object-oriented database is ObjectStore from Object Design of Burlington, Mass. An example unstructured database is Notes from the Lotus Corporation, of Cambridge, Mass. A database also may be constructed using a flat file system, for example by using files with character-delimited fields, such as in early versions of dBASE, now known as Visual dBASE from Inprise Corp. of Scotts Valley, Calif., formerly Borland International Corp.

The operating system 54 may be, for example, Windows95, Windows98 or WindowsNT from Microsoft Corporation. Using this operating system, the database 64 may be accessed through the Open Database Connection (ODBC) protocol. Other example operating systems are noted above. The invention is not limited to any particular operating system nor to those mentioned herein. The operating system used in any particular embodiment affects which commands an application may use to cause the operating system to generate a visual form of data for access by either a print driver or other application. In the following description, the Windows95, Windows98 and WindowsNT operating systems are only illustrative. Other operating systems may be used with corresponding changes to how their output is used and how control is coordinated among the modules of the system according to the specification of the operating system. The following description illustrates how function calls from an application to the Windows operating systems, e.g., print commands, may be used to transfer data from the application into a database. Other function calls to the operating system also may be used. Other mechanisms through which the visual form of data is transferred from one application to another in a standard form also may be used.

Using the Windows95, Windows98 and WindowsNT operating systems, the data 56 representing the visual form of the data output by the operating system in response to function calls from an application to print the data is in a Windows Metafile format, according to Microsoft. A metafile is a vector image, or, a list of commands, draw objects, text, and commands to control style. Theoretically, a metafile may be used in any Windows application. A Windows metafile (WMF) is a 16-bit metafile that is supported by Windows 3.1. An enhanced metafile (EMF) is a 32-bit enhanced metafile that is supported by Windows 95, Windows 98, and Windows NT having a super set of WMF commands.

Figure 2:
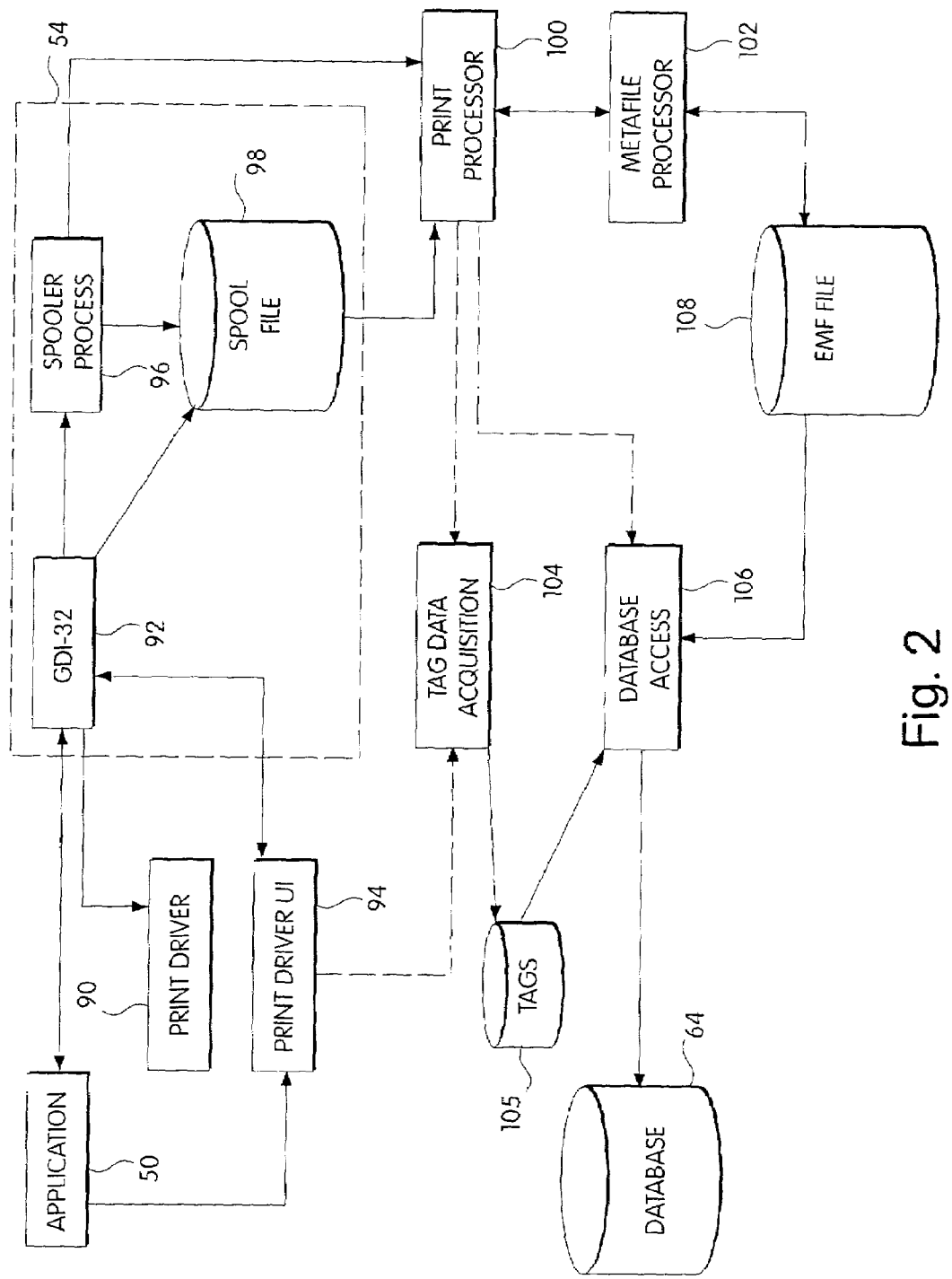
FIG. 2 is a block diagram illustrating operations of a print process in a Windows environment.

Referring now to FIG. 2, the operation of printing in the Windows operating systems and its use to capture the visual form of data from an application into a database will now be described. In order to print on a printer in a Windows environment, the printer has an associated print driver 90. When the printer is installed, the operating system is informed of the location of the print driver, i.e., its file name. The print driver specifies the characteristics of the printer to the operating system.

An application 50 (as in FIG. 1) permits a user to select a printer through a user interface, such as a graphical user interface with menus. The selected printer also may have various printing options that may be selected. Through a function call made by the application in response to user input, the user may invoke a user interface 94 for the print driver to permit the user to specify user information and printing preferences. Given a selected printer, preferences and information to be printed, the application 50 issues function calls to a Graphics Device Interface (GDI-32) 92, which is part of the Windows operating system. The GDI-32 requests the selected print driver 90 and its user interface for information about the printer that in turn is given back to the application 50, and is retained by the GDI-32, to assist in the process of generating a correct sequence of function calls to the operating system to print the selected information.

The GDI-32 outputs data into spool files 98 and makes function calls with the names of the spool files to the spooler process 96 to queue the spool files for printing on their designated printers. A spool file in the Windows operating system is designated as a Windows metafile by Microsoft. A printer spool file is not a true metafile, however, because it actually contains printer setup data in addition to any referenced or embedded metafiles. In Windows95, a spool file contains the file names of any metafiles. In WindowsNT, the metafiles are embedded in the spool file. In both cases, there is one spool file per printed document, and each page of a document has a separate metafile.

The spooler process 96 is informed about the location of a print processor 100 associated with the selected print driver 90. The spooler process 96 calls the print processor to process any spool files that the spooler process has queued for the print processor. Generally, a typical print processor receives the spool file 98 from the spooler process 96 and converts it to a format used by the printer, such a printer control language (PCL), PostScript or other, typically proprietary, format. Instead of printing, the print processor 100 in FIG. 2 causes the vector image data produced by the operating system to be formatted, associated with tags, and stored in a database.

More details about metafiles, print drivers, print processors, spooler processes and spool files are available through the Microsoft Developer Network and the Microsoft Development Network Library accessible through the Internet.

In one implementation shown in FIG. 2, the print processor 100 spawns two processes. The first process, tag data acquisition process 104, described in more detail below in connection with FIG. 7, obtains the tag information from the user for the report being stored in the database. This process provides a user interface to the user to allow the user to input data for the tags and stores the tags in a file 105 having a predetermined name. The user may enter tags for each report or may indicate a request for batch printing in which case the tag data acquisition process uses an initial set of tags to compute tags for each report to be stored in the database without user interaction. The second process, database access process 106, described in more detail below also in connection with FIG. 7, obtains both the tag information from the tag data acquisition process 104 through the file 105 and the names of the metafiles 108 to be stored. The tags and the metafiles are processed and sent to the database 64.

Although the print processor 100 may read the data from the spool file and store that data in the database with the tags, it has been found that in some instances a vector image, e.g., a Windows metafile, in the spool file might not be scalable. In other ways noted above, the spool file also is not a true Windows metafile. Therefore, a metafile processor 102, described in more detail below in connection with FIGS. 14 through 16, responds to function calls from the print processor 100 to process the spool file into metafiles 108, to improve their scalability and otherwise reformat the spool file into one or more Windows metafiles, one for each page of the report or document being printed. The file names of the metafiles 108 resulting from processing the spool files are made available to the database access process 106, either through the print processor 100 or directly by the metafile processor 102.

The print driver 90, print driver user interface 94, print processor 100, metafile processor 102, tag data acquisition process 104 and database access process 106 form the database storage module 58 in FIG. 1.

Having now described how the print driver and print processor store the visual form of data from an application in a database, the database in which this data is stored will now be described in more detail. The database stores the reports and tags using a structure appropriate to the selected database type. The kinds of information that may be stored, i.e., the tags, may include any combination of, for example, information about the report, computer environment information, user information, organizational information and date and time information. Various other information also may be stored as desired with appropriate changes to the database structure. Example information about the report includes a name for the report, a number of pages and a project for which the report is prepared, user comments, the source application and any batch identifier. Example computer environment information includes the name and/or version of the application that created the report, a machine identifier, machine location, operating system and any group or domain name for the machine. Example user information includes a user identifier, such as a login name, and contact information. Example organizational information includes the user's title and the name of a group to which the user belongs.

FIGS. 3–6 illustrate an example database schema for storing the reports and tags in a relational database. It should be understood that any other database schema may be used and that the following example is merely illustrative. The variable types are specified for Oracle and Microsoft Access databases. It should be understood that other databases could be used and that these variable types would be defined according to the specifications and operation of the other databases.

FIG. 3 illustrates a main table 300 that contains records with the tag information for each report. In this table, each report is printed into the database and added as a record, with each record being assigned a unique identifier, LTId. The LTId may be generated by incrementing and updating the value stored in field 602 in FIG. 6, LTLastId, described below. Main table 300 includes in field 1, 302, LTId, an integer type variable in both Access and Oracle, which is the report identification number. In field 2, 304, the LTVerson is an integer type variable in both Access and Oracle, and is the version of the database schema in use when the record was inserted into the database. In field 3, 306, LTPrjDesc is a Varchar(50) type variable in both Access and Oracle, and is a 50 character description of the project. In field 4, 308, LTRepNme is a Varchar(30) type variable in both Access and Oracle, and is a 30 character description of the report name. In field 5, 310, LTRepId is a Varchar(150) type variable in both Access and Oracle, and is a 150 character description of the report identification name. In field 6, 312, LTBtchId is a Varchar(30) type variable in both Access and Oracle, and is a 30 character description of the batch identification. In field 7, 314, LTUsrNme is a Varchar(30) type variable in both Access and Oracle, and is a 30 character description of the user name. In field 8, 316, LTUsrCmnt is a Varchar(254) type variable in both Access and Oracle, and is a 254 character description of any user comments. A user may insert keywords or other information in this field to facilitate later retrieval. In field 9, 318, LTPrtDat is a Varchar(30) type variable in both Access and Oracle, and is up to 30 characters identifying the print date. In field 10, 320, LTPrtTim is a Varchar(30) type variable in both Access and Oracle and is up to 30 characters identifying the print time. In field 11, 322, LTPrtApp is a Varchar(50) type variable in both Access and Oracle, and is a 50 character description of the of the name of the source application. In field 12, 324, LTMachNme is a Varchar(50) type variable in both Access and Oracle, and is a 50 character description of the machine name on which the source application was executed. In field 13, 326, LTDomnNme is a Varchar(50) type variable in both Access and Oracle, and is a 50 character description of the domain or workgroup name in which the machine is located. In field 14, 328, LTLogNme is a Varchar(50) type variable in both Access and Oracle, and is a 50 character description of the login name of the user of the source application. In field 15, 330, LTXExtnt is an integer variable type in both Access and Oracle and is X extent of pages in the report. In field 16, 332, LTYExtnt is an integer variable in both Access and Oracle and is the Y extent of pages in the report. In field 17, 334, LTNumOfPg is an integer type variable in both Access and Oracle and is the number of pages in the report. In one embodiment, if this field is left blank then the number of pages is computed for the LTId from the table in FIG. 4. In field 18, 336, LRCRC32 is an integer type variable in both Access and Oracle and is the CRC of the tags and numeric data in the record. In one embodiment, if the calculated value of the CRC does not match the stored value, this is indicative that the data is corrupted.

Figure 4:
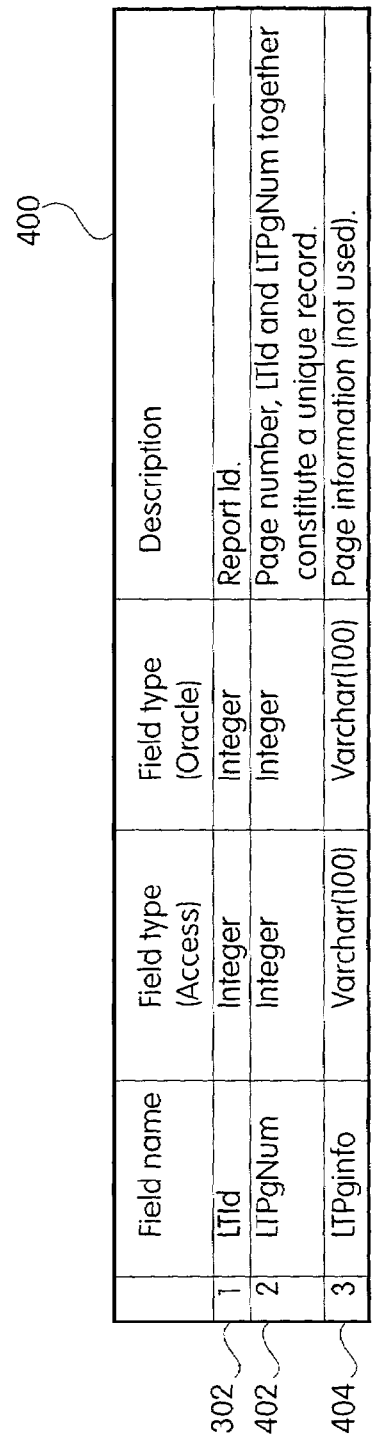
FIG. 4 is a schematic representation of another database table structure for the database.

FIG. 4 illustrates a page table 400. Page table 400 includes records that help identify the number of pages in a report. In one embodiment, each page is identified using a page number, with a sequence of page numbers beginning with one. In one embodiment, the table is indexed by combining the LTId, record 1, 302, and the page number. In field 1, 302, LTId is an integer type variable in both Access and Oracle, and is the report identification number. In field 2, 402, LTPgNum is an integer variable type in both Access and Oracle that represents the page number of a record. In one embodiment, the LTId and LTPgNum constitute a unique record identifier. In field 3, 404, LTPgInfo is a Varchar(100) type variable in both Access and Oracle and is a 50 character description of the page information. This record may be omitted.

FIG. 5 illustrates a metafile data table 500. The metafile data table 500 includes the records that hold the metafiles. In one embodiment, each printed page is a metafile that is stored in this table. In one embodiment, the metafile can be compressed and encoded and this is indicated by a particular record identifying the buffer type. Data table 500 can include in field 1, 302, LTId, an integer type variable in both Access and Oracle, which is the report identification number. In field 2, 402, LTPgNum is an integer variable type in both Access and Oracle that represents the page number of a record. In field 3, 502, LTMFRNum is an integer variable type in both Access and Oracle and represents a metafile record number. In one embodiment, the LTId, LTPgNum, and LTMFRNum constitute a unique record identifier. In field 4, 504, LTMFBfTY is an integer variable type in both Access and Oracle that represents a metafile buffer type. In one embodiment, the buffer type is used to particularly identify the type of metafile record stored and in one embodiment can be a regular, enhanced, base-64 encoded, or other form of metafile record. In field 5, 506, LTMFBfLn is an integer variable type in both Access and Oracle that represents the length of data in the LTMFBufr, field 6, 508. In field 6, 508, LTMFBufr is a memo variable type in Access and a long variable type in Oracle that includes a piece of the metafile record stored in blocks. Each block has a size, such as 16K bytes.

FIG. 6 illustrates a control table 600. Control table 600 includes in field 1, 602, LTLastId, which is an integer variable in both Access and Oracle that represents the last LTId inserted in the database. The value may be kept the same if a record is deleted instead of decremented. The value may be reset to 0 if all the records are deleted to allow the new entries to start from 1. The value may have a maximum value, such as 4, 294,967, 295.

Having now described the database and how it is structured, access to the database for storing and retrieving information will now be described. For several reasons, a program called a "service layer" is provided through which other applications access the database. For example, the service layer isolates applications from the complexities of the database by providing simple function calls that other applications may make to the service layer to perform various database operations. The service layer performs operations on the database, for example through ODBC calls, in response to a function call from an application. Also, by providing error checking and data encoding in the service layer, any altered data in the database can be detected.

Figure 7:
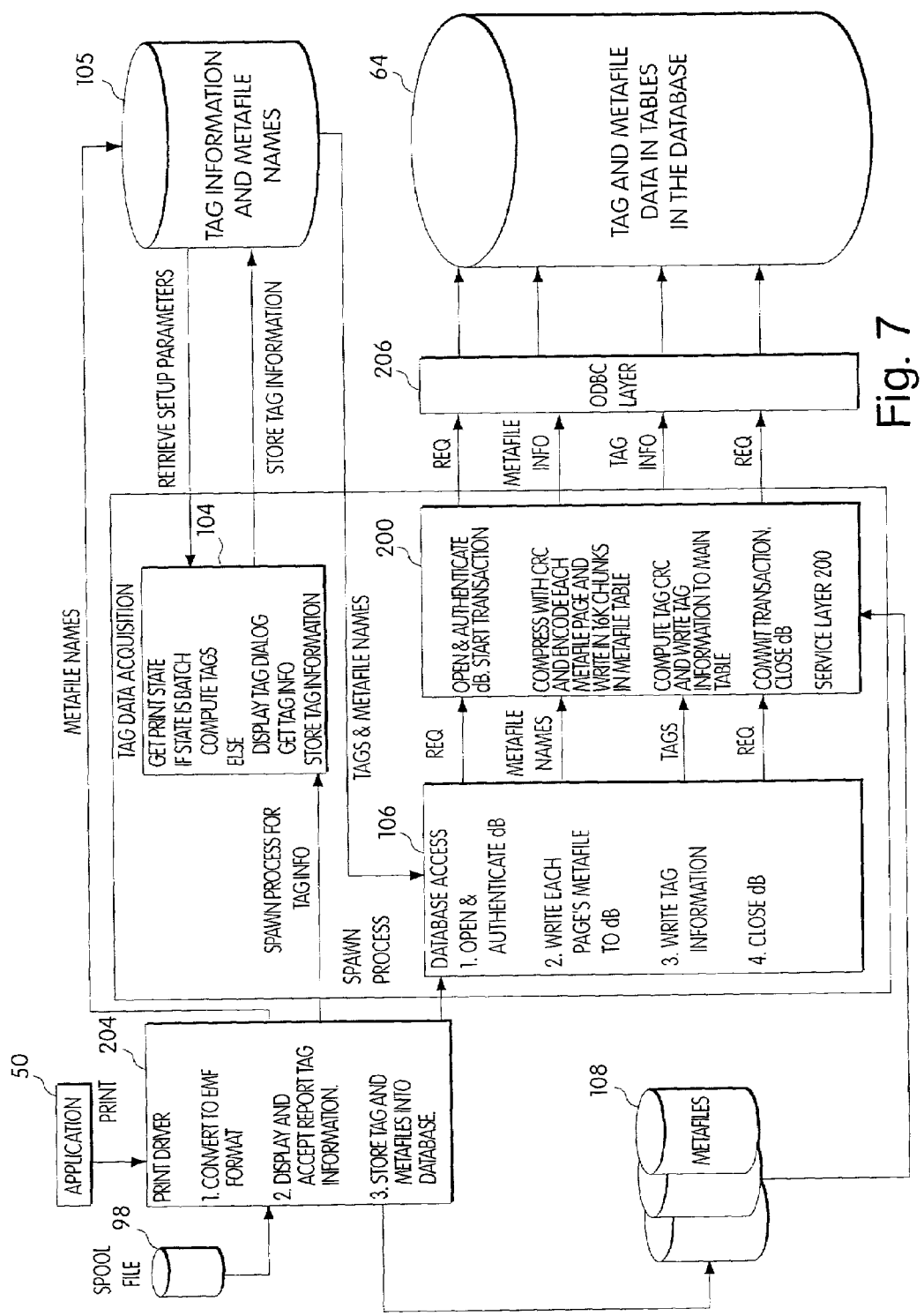
FIG. 7 is a block diagram illustrating the information storage and retrieval system of FIG. 1 with a service layer through which access to the database is coordinated.

FIG. 7 illustrates in more detail how the print driver 90, print processor 100, metafile processor 102 and print driver user interface 94 of FIG. 2, shown as the "print driver" 204 in FIG. 7, interact with the service layer 200. The operation of the service layer 200 when retrieving information from the database will be described in more detail in connection with FIGS. 8 through 13. In FIG. 7, the service layer 200 receives a report (metafiles 108) created by the print driver 204 and the tag data through database access process 106 from files 105 which specify the tags and the names of the files 108 containing the metafile data for the reports. This data is stored by the service layer through calls to the ODBC layer 206 into the database 64. The interaction of the print driver 204, database access process 106 and tag data acquisition 104 with the service layer 200 will now be described in more detail.

In general, as noted above, the print driver 204 causes metafiles 108 to be created from a spool file 98, with the metafile names stored in files 105. The tag data also are stored in files 105 by tag data acquisition process 104. The tag data acquisition process is spawned by the print driver 204 to obtain the tag data from the user for this report. Tag data acquisition module has two modes of operation: batch and manual. This mode of operation may be set by a user for a given application, or for all applications, through the print driver user interface 94. This setup information is stored in files 105. When the tag data acquisition process is spawned, the print state is retrieved from the setup parameters. If the print state for this application is batch printing, a set of tags is computed from any previously stored tags for this application. Otherwise, a dialog box is displayed to the user to request the user to input tag information. After the user has input the tag information or after the tag information is computed, the tag information for this application is stored in files 105.

The database access module 106 is spawned by the print driver 204 to store tags and metafiles into the database. In particular, database access module 106 opens the database and handles any authentication that may be required by the database. To perform this operation, the database access process 106 issues a request to the service layer 200 which, in turn, issues a request through the ODBC layer 206 to the database to open and authenticate this user for the database and begin the database transaction. After successful opening and authentication, database access process 106 issues a request to the service layer 200 to store the metafiles specified by the metafile names from file 105. In response to this request, the service layer retrieves the metafiles 108 corresponding to the metafile names received from the database access process 106 and stores them in the metafile table in the database by issuing requests through the ODBC layer 206. The database access process 106 requests the service layer to store the tag information by providing the tags to the service layer 200. The service layer 200 writes the tag information to the main table in the database by issuing requests through the ODBC layer 206. The database access process 106 closes the database by issuing a request to the service layer 200. The service layer 200 then commits the transaction in the database and closes the database through requests to the ODBC layer 206.

The service layer 200 also may provide both more efficient storage and data integrity checking while storing a report and tags in the database. For example, as shown in FIG. 7, the incoming visual form of the data may be compressed using a data compression algorithm, of which several are known in the art. A lossless compression algorithm is preferable, such as available in the Crusher software library from DC Micro Development. An error checking calculation, such as a cyclical redundancy check (CRC) operation, may be used to compute a CRC value for the compressed data. When reading data from the database, the CRC value for the read data may be calculated and compared to the stored value to detect whether the data has been corrupted. The tag data also may be processed to compute a CRC value for the tag data. When reading the tag data from the database, the CRC value is checked to verify the integrity of the tag data. The compressed visual form of the data also may be encoded to allow storage in databases that do not support storage of 8-bit binary data. An example encoding technique is base 64 encoding. The encoded data is split into blocks of 16 kilobytes. A database record is written for each block of each page of the encoded data.

The service layer also acts as an intermediary between applications and the database to permit an application to search the database in response to user queries and to retrieve data from the database. The operations of the service layer in connection with two other applications that use the service layer will now be described in more detail in connection with FIGS. 8 through 13.

In general, the service layer 200 reverses operations performed on the data when the data was written to the database. For example, the service layer decodes the data, checks the CRC value to ascertain data integrity and decompresses the data prior to passing the data to another application. Similarly, the tag data is retrieved and the CRC value is checked before the tag data is passed to another application. The service layer also queries the database according to queries provided from another application.

Figure 8:
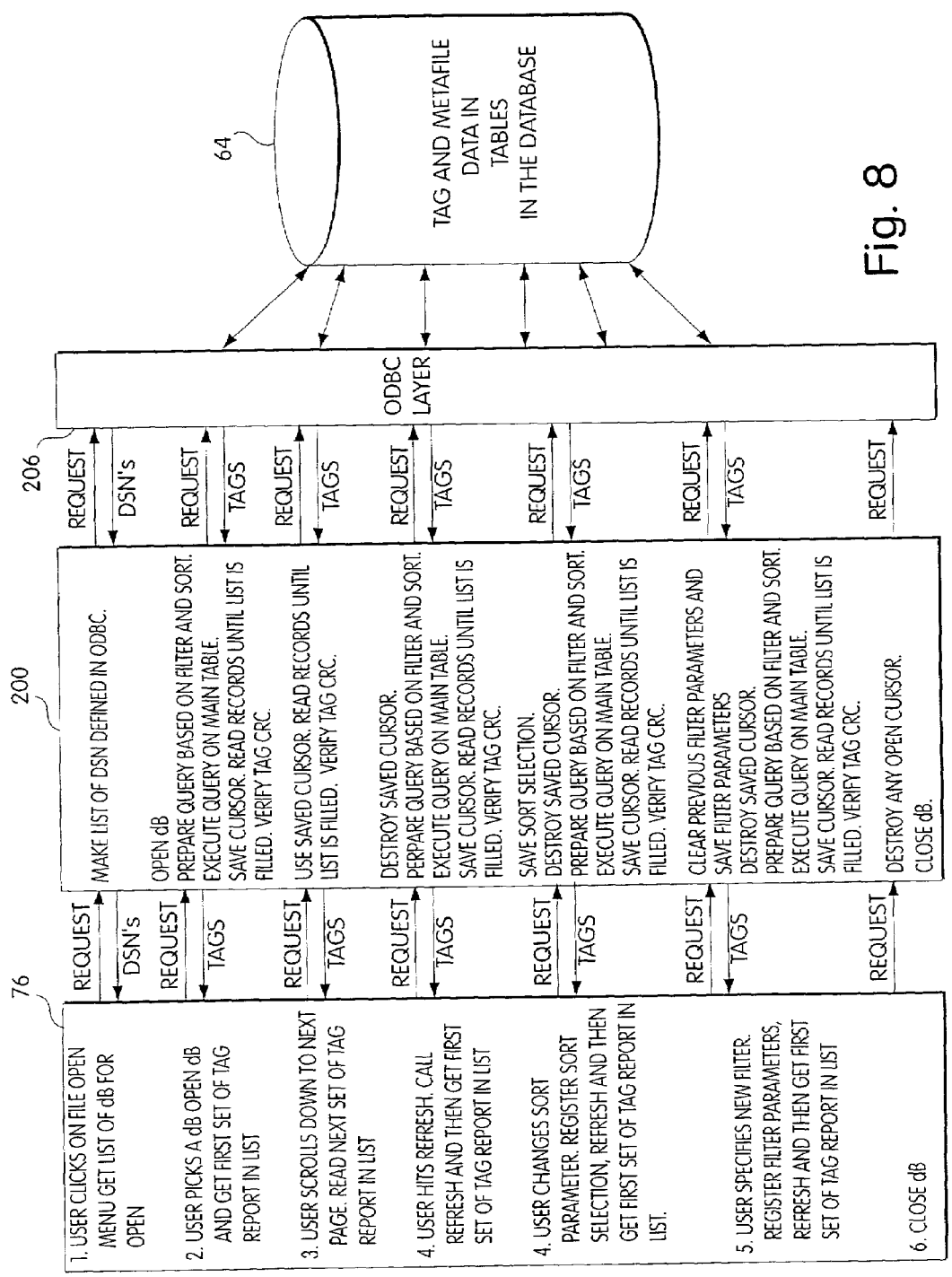
FIG. 8 is a dataflow diagram illustrating sorting and filtering of the database.

FIG. 8 illustrates the interaction between the query interface 76 (FIG. 1), service layer 200 (FIG. 7) and the database when a user selects a database to view and specifies a sort or filter operation to be applied to the database records. The query interface 76 receives a request from a user to open a database. In response, query interface 76 passes the request to the service layer. The service layer issues a request to the ODBC layer to obtain a list of databases, each having a name. The service layer receives this list and provides it to the display for presentation to and selection by the user.

After a user selects a database, and optionally specifies a filter or sort operation, the query interface issues a request to the service layer to open the database. Any filter or sort operation may be defined according to the database structure and the query language used to access the database. The service layer issues a request through the ODBC layer 206 to the database to open the database for this user. The database may prompt the user for a username and password. The service layer prepares a query based on any sort or filter parameters specified by the user. This query is issued to the database and applied to the main table. A set of records is received from the database by the service layer and the CRC values of the tags are verified. The set of records is placed in a list, with each entry additionally having a flag to indicate whether the CRC values of the tags for the record were correct. The list is returned to the query interface for presentation to the user. When displayed, the query interface may provide a visual indication to the user of whether any record has been altered based on the CRC flag. The list may have a limited number of entries, in which case the service layer stops reading records from the database and saves a cursor when the list is full.

The user may navigate through the list, for example, by scrolling through the list or by scrolling through pages of the list. The query interface, in response to scrolling commands from the user, requests the service layer to access more records from the database as needed. The user also may decide to refresh the list. The query interface, in response to a refresh command, issues a refresh command to the service layer. The service layer in turn invalidates any saved cursor and creates a new list of records in the same manner as described above.

The user also may decide to change the sort or filter parameters. The query interface, in response to a change in the sort or filter parameters, sends the new parameters to the service layer, which stores the parameters. The query interface then issues a refresh command to the service layer and receives a new set of tags.

The user may terminate usage of the query interface by closing the database, which causes a request to be sent by the query interface to the service layer. The service layer in turn invalidates any stored cursor and issues a close command to the database through the ODBC layer.

Other database management functions can be performed by the user in addition to searching the database using sort and filter commands. Such functions include copying records from one database to another, deleting records from a database, moving records from one database to another (performed by copying the records and deleting them), and merging databases together (performed by copying all the records from two or more databases into another).

Figure 9:
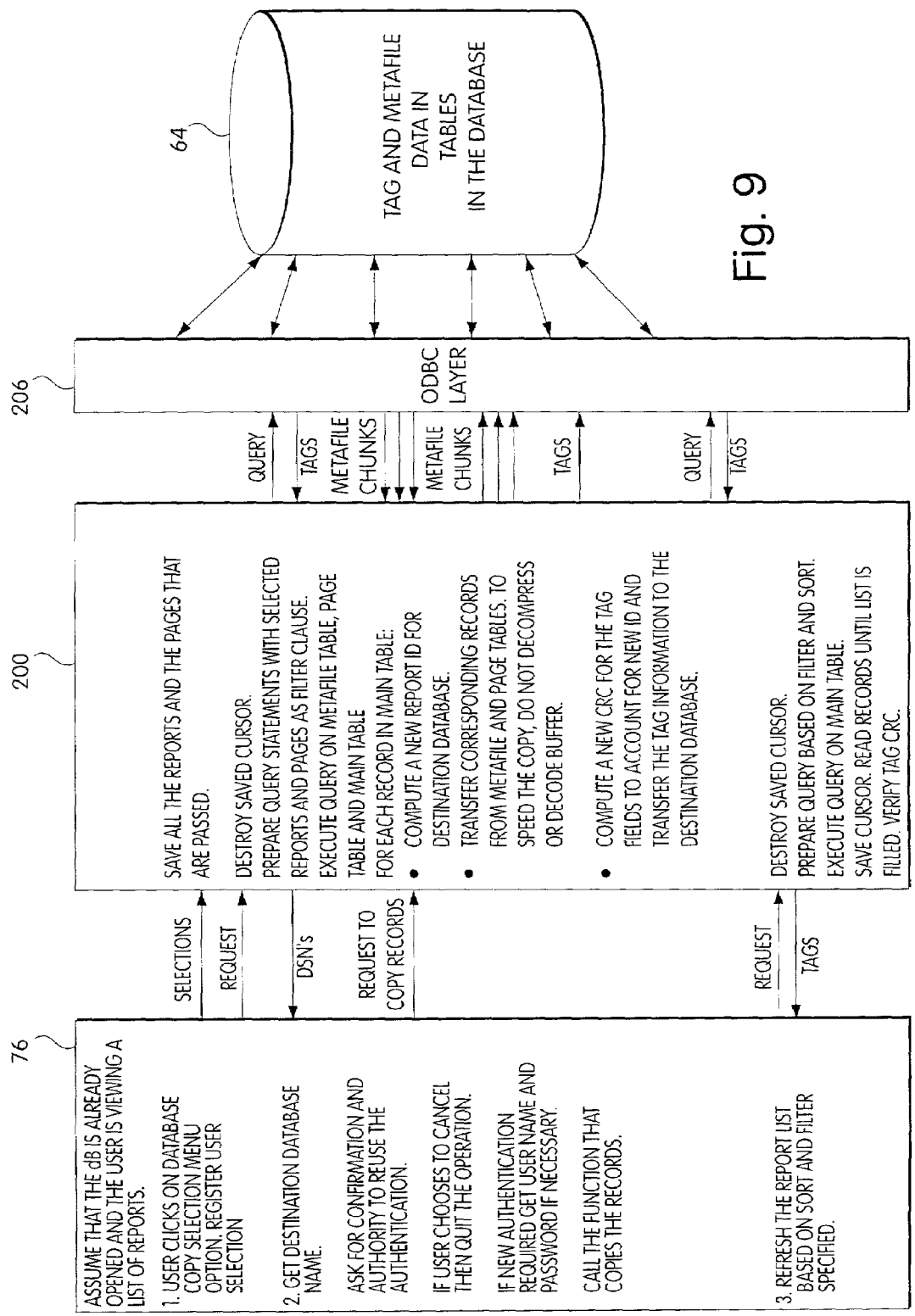
FIG. 9 is a dataflow diagram illustrating copying records in a database.

Copying of records from one database to another will now be described in connection with FIG. 9. It is assumed that a user has already opened the database and is viewing a set of reports. The query interface 76 receives the user selection of one or more records, and a command from the user to copy the selected records to a database. The selected records are indicated to the service layer by the query interface. The display then prompts the user for a database name to be opened, in a manner described above. The database to which the records are to be copied is opened through the service layer and the database may prompt the user for authentication.

The query interface issues a request to the service layer to copy the selected records. In response, the service layer invalidates any saved cursor and prepares query statements based on the selected reports and pages as a filter. The query is executed on the metafile, page and main tables of the database. For each record in the main table, a new report identifier is computed for the destination database using its control table. The records retrieved from the database are copied to the corresponding main, page and metafile page tables of the destination database. The metafiles are not decompressed or decoded to save processing time. A new CRC value is computed for the tag fields to account for the new identifier for the report before sending the new tags to the destination database. The report list from the current database is refreshed in the query interface in the manner described above.

Figure 10:
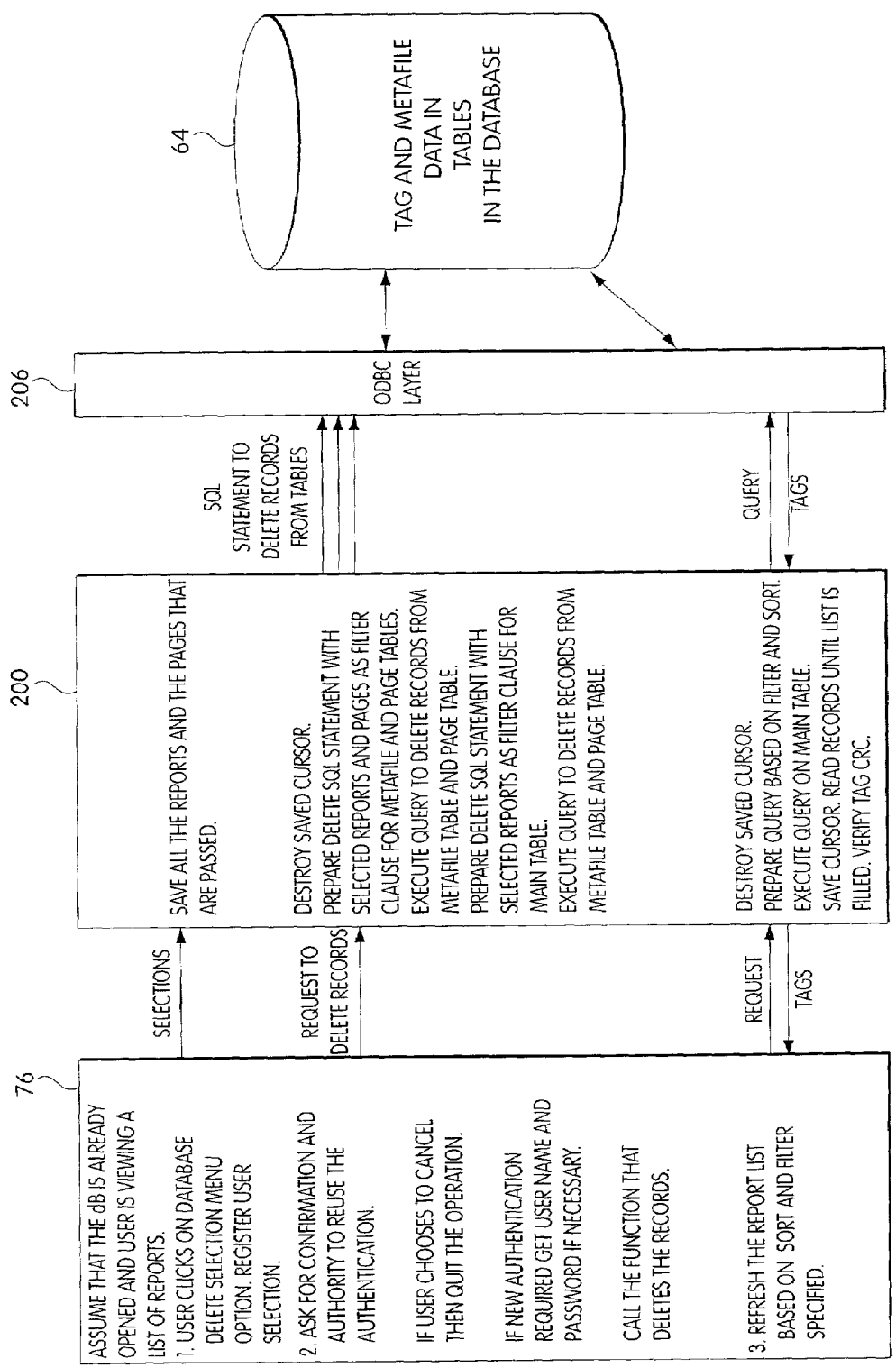
FIG. 10 is a dataflow diagram illustrating deleting records from a database.
Figure 11:
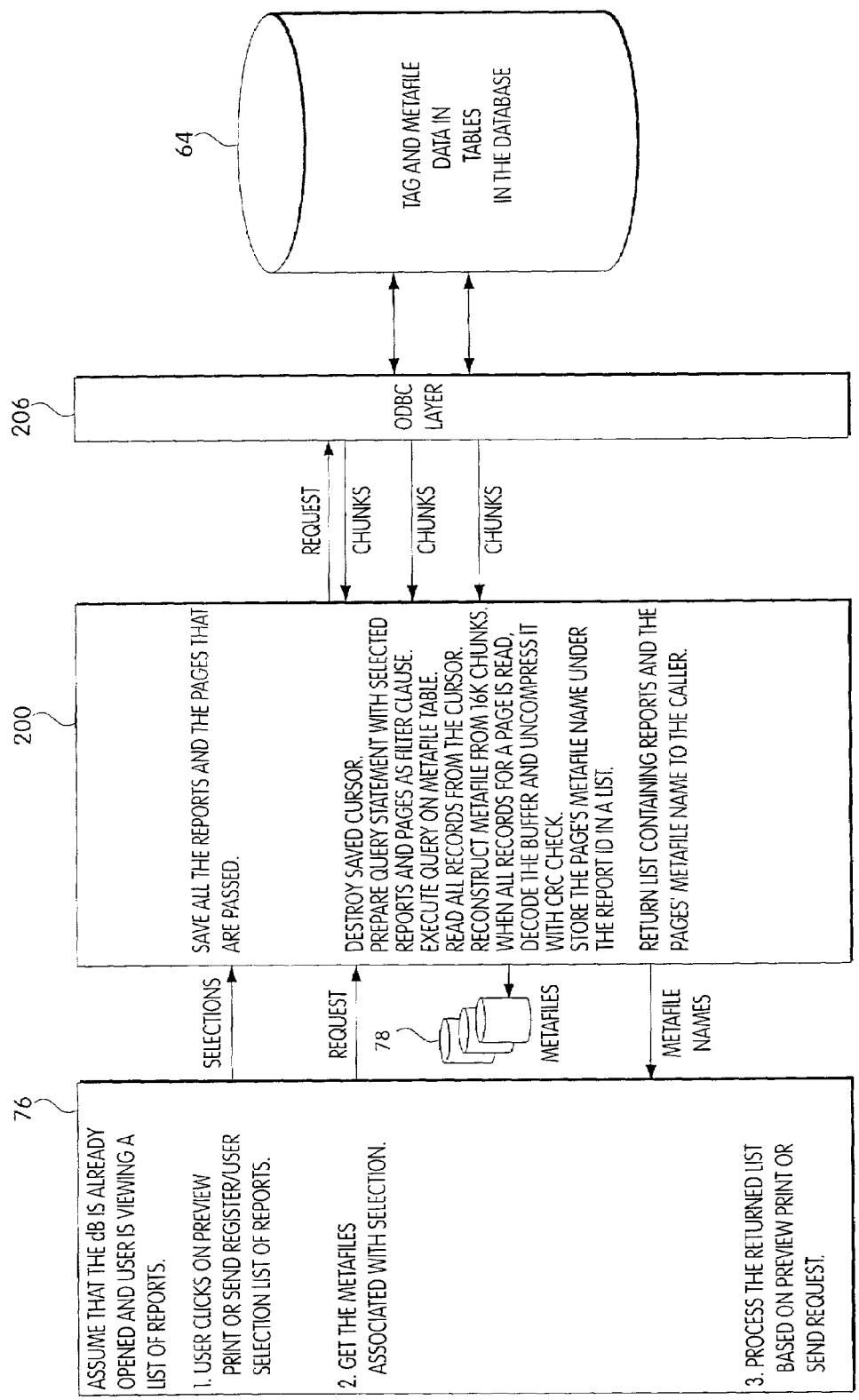
FIG. 11 is a dataflow diagram illustrating printing, previewing or sending reports from the query interface.

Deleting records from a database will now be described in connection with FIG. 10. It is assumed that a user has already opened the database and is viewing a set of reports. The query interface 76 receives the user selection of one or more records, and a command from the user to delete the selected records from the currently open database. The selected records are indicated to the service layer by the query interface. The authentication used by the user when the database was opened is verified with the user. The database may prompt the user for new authentication.

The query interface issues a request to the service layer to delete the selected records. In response, the service layer invalidates any saved cursor and prepares delete statements to be issued to the database based on the selected reports and pages as a filter. The query is executed on the metafile and page tables of the database to delete the records. A delete statement is prepared for the main table of the database using the selected reports as a filter. This statement is executed on the main table to delete the records for the report. The report list from the current database is then refreshed in the query interface in the manner described above.

After a user has already opened the database and is viewing a set of reports, the user may select one or more reports to be printed, previewed or sent to another application. Such printing, previewing and sending of reports from the database will now be described in connection with FIGS. 11–13. The query interface 76 receives the user selection of one or more records, and a command from the user to print, preview or send the reports associated with the selected records. The selected records are indicated to the service layer by the query interface. The metafiles for the selected records then are requested from the service layer by the query interface.

The service layer invalidates any saved cursor and prepares a query statement with the selected reports and pages as a filter. The query is executed on the metafile table of the database. When all of the records for a page are read, the pieces of the records are reassembled, decoded and uncompressed, and the CRC value for the page is verified. The metafile for each page of each report is stored in a named temporary file as indicated at 78. A list of report identifiers, page numbers and metafile names is constructed and returned to the query interface. The query interface processes the list according to whether the command was a print, preview or send, in a manner that will now be described.

If the command was a print, the display simply plays the temporary metafile(s) to a device context for the specified printer using the operating system.

Figure 12:
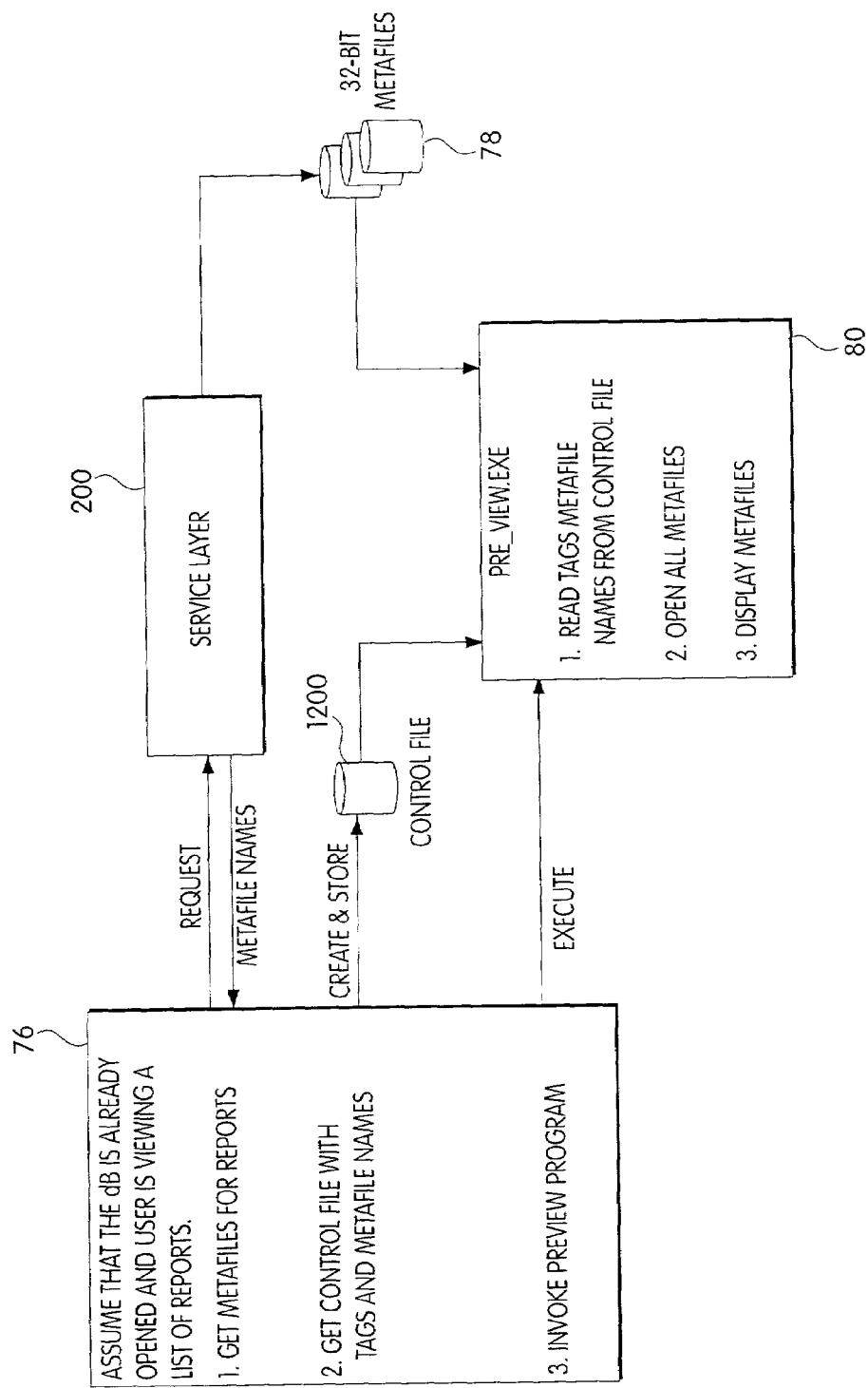
FIG. 12 is a dataflow diagram illustrating previewing of a report.

If the command was a preview, the query interface operates in a manner to be described in more detail in connection with FIG. 12. In particular, a control file 1200 with a predetermined name is created including the tags and names of the temporary files containing the metafile for each page of each report to be previewed. The query interface spawns the report previewer 80, a separate program, which in turn accesses the control file to read and display the reports. The report previewer 80 displays the reports by playing the metafiles to a device context for the display, i.e., by issuing a play metafile command to the operating system.

The previewer may perform many kinds of operations on the played metafile data, including permitting the user to scroll through the display and view different pages of the report. The previewer also may permit a user to find instances of specified text in the report. However, searching for text in a particular order in a metafile is complicated by the fact that the TEXTOUT commands in the metafile may not occur in the same order in the metafile as the corresponding text would appear when displayed. Accordingly, the report previewer processes the text in each selected metafile into an ordered list so that words may be searched in the order that they appear within each metafile. Such ordering also permits any previous or next occurrences of a word or other character string to be identified in the metafile and among a set of metafiles. Documents from many different applications may be searched together using this technique.

Ordering text in metafile is performed in the following manner. Each TEXTOUT command is identified in the metafile and its corresponding coordinates are obtained. The variety of TEXTOUT commands are then sorted by page (i.e., metafile), then by Y position in the display area, then by X position in the display The sorted commands are converted into a doubly linked list of records of text strings and the position of the text string in the display. Any text strings that are close together, within a percentage of the text height, may be concatenated in this structure. Any efficient sorting algorithm may be used to perform this sort information. For example, an insertion sort may be used.

Figure 17:
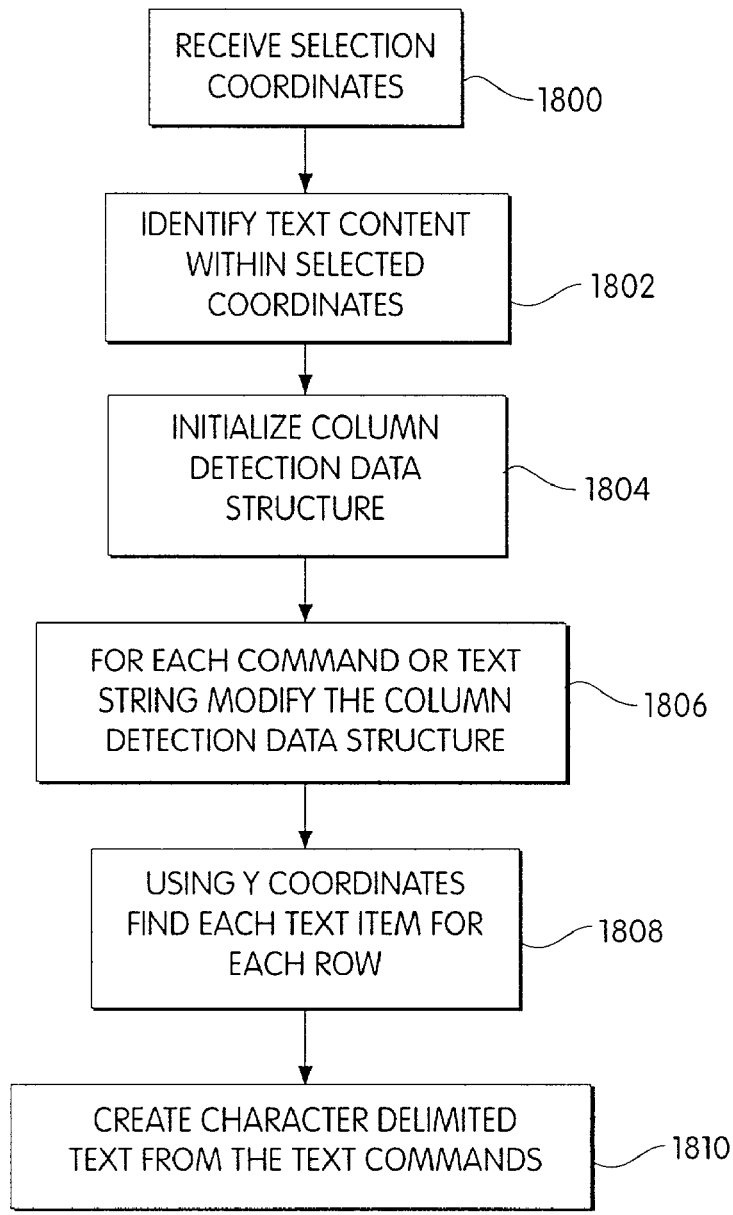
FIG. 17 is a flow chart describing how text data can be converted to character delimited data, in particular tab delimited data for insertion into a table for spreadsheets.

Both the query interface and the report previewer may permit a user to send a metafile 78 (or in the case of the previewer, a selected portion of a metafile 82) to another application 84. The send operation also may send a report including all graphics, including text only, or including text transformed into a table (which is described in more detail below in connection with FIG. 17). This operation will now be described in connection with FIG. 13. This operation allows data to be selected and inserted into documents being authored using other applications.

From the query interface, the process of sending a report is similar to previewing. In addition, the user is prompted for the name of the destination application to which the metafile will be sent. A control file 1300 is created with metafile names, the name of the destination application and a set of keystrokes defining how a paste is performed in the destination application. A separate computer program 1302 called "Send" is executed instead of the report previewer, which operates on the control file 1300 in a manner described below to paste the report in a currently opened document in the destination application 84.

The "Send" program also may be executed by the report previewer 80. The user provides the name of the destination application. The report previewer creates a new temporary metafile 82 based on the user's selection, in a manner described below. A control file 1304 similar to the control file 1300 created by the query interface is created and the "Send" program 1302 is executed in the same manner.

The appropriate keystrokes for the Send program to issue to the destination application may be determined in many ways. For example, the menus of the application may be searched for the command "Paste" to identify the corresponding keystrokes. Alternatively, the keystrokes for various applications may be determined in advance and saved in a file accessible by the Send program. As a default, because the keystroke for the paste function in a user interface for a standard Windows application is Ctrl-V, this keystroke also could be used.

How the report previewer creates a new metafile based on a user's selection of a portion of a metafile will now be described. A user's selection generally is represented by coordinates defining a rectangle in the area in which the metafile is displayed. Each command of the metafile is then compared to the defined coordinates. Any commands that do not have associated coordinates are automatically placed into the new metafile. Any commands that produce display information outside of the specified coordinates are discarded. Any commands that produce display information inside the specified coordinates are retained. In some cases, a command may produce display information both inside and outside the specified coordinates. These commands, such as line segments and bit maps, may be readily modified to be constrained within the specified coordinates using known techniques. The resulting set of metafile commands are stored in named temporary files whose filenames are listed in the control file.

The "Send" program 1302 will now be described. This program first reads the control file 1300 or 1304 using its predetermined name. The "Send" program 1302 does not need to know whether it was invoked by the query interface 76 or the report previewer 80. Any 32-bit metafiles (EMF) specified in the control file may be converted to 16-bit metafiles (WMF) 1310 through a request to a metafile processor 1306. The conversion also may be performed automatically by the Windows GDI-32 if only the EMF files are placed on the clipboard. The conversion performed by the metafile processor 1306 deletes "color space" records, any intercharacter spacing in "TEXTOUT" records (described below) and any "modify world transform" records that contain illegal parameter values.

Clipping records created by Windows95 also may be modified. In particular, the viewport and window origins are tracked to maintain current values. The boundaries of clipping regions are adjusted, using known techniques, to account for the current viewport and window origins. Some clipping records also cause text to be incorrectly hidden when the metafile is played. Any clipping record that affects a text record is modified or removed if necessary to prevent text from being incorrectly hidden.

The 16-bit and 32-bit metafiles both are placed on the "Clipboard" 1308 through clipboard placement 1312 which makes a function call to the operating system. The clipboard is an area of memory in which data may be stored temporarily and from which data may be read by any application. In order to place data on the clipboard, a command such as "cut" or "copy" is used. A "paste" function generally is provided by most applications to read data from the clipboard to place the data at the current location in the document currently being processed by the application.

The Send program then sends the keystrokes to the destination application via the operating system to cause the application to paste the data from the keyboard into its current document.

Figure 13:
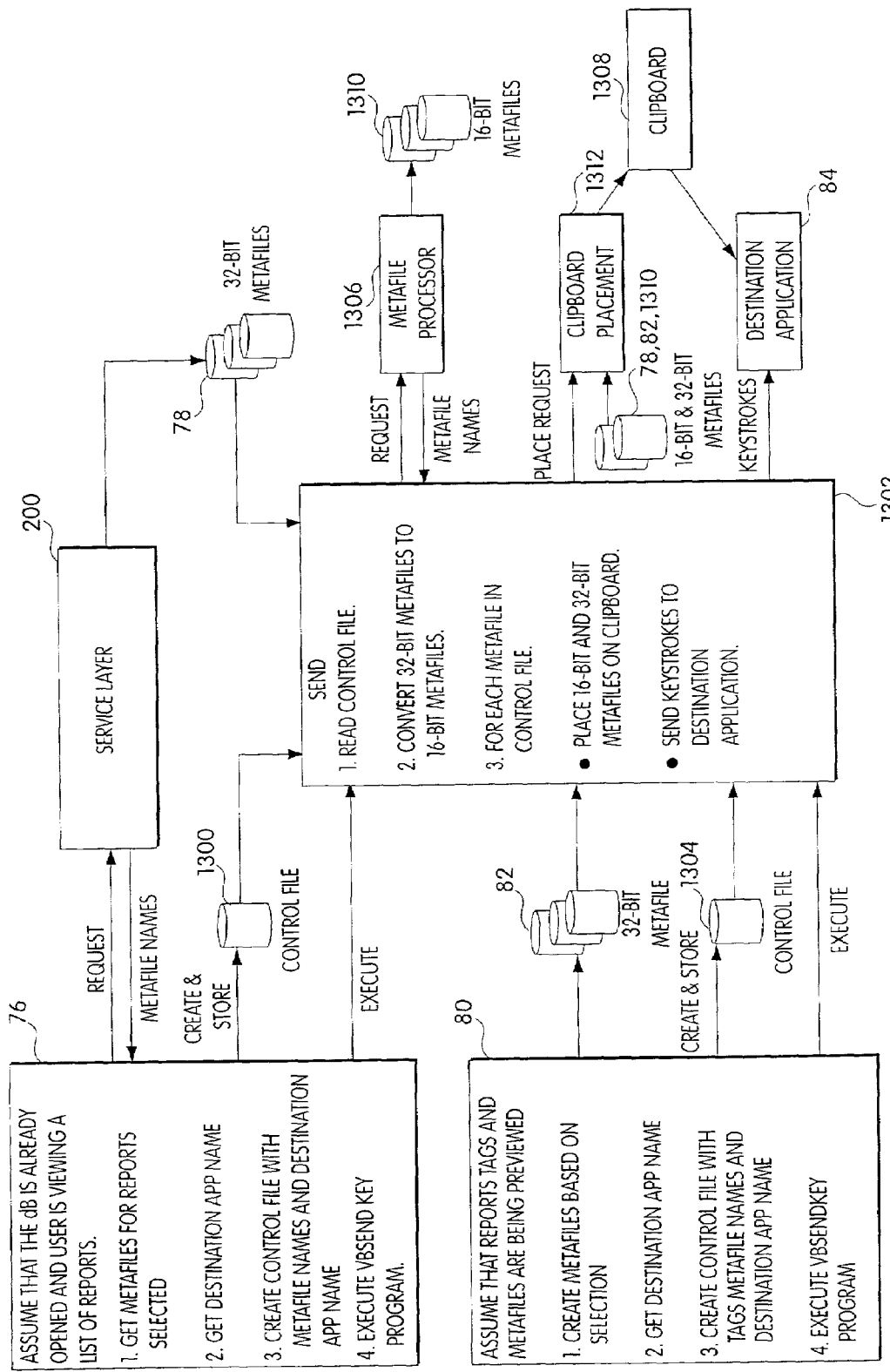
FIG. 13 is a dataflow diagram illustrating sending a report to another application.

The send operation described in connection with FIG. 13 is not limited to the implementation shown and can be provided in many ways. For example, the query interface and report previewer are described above as determining the set of keystrokes for a given application. These keystrokes also may be determined or may be accessed by the Send program directly and not through control files 1300 or 1304. Alternatively, the entirety of the Send program 1302 may be implemented in the query interface 76 and the report previewer 80. The send operation also may be provided to send metafiles from one source application to another destination application if the source application enables third parties to develop "plug-in" macros or libraries to add new functions to the source application's menus or toolbars. An example source application that has such capability is Word from Microsoft Corporation. In such an application, the combined functionality of the previewer or query interface and the send program would be invoked by the source application to transmit metafile data directly to the destination application.

As noted above, the spool files 98 are not true metafiles. The visual form of the data provided by the operating system in response to an application, for example through printing, also may become distorted if transformed, for example, if scaled or rotated. Such distortions generally are attributable to the fact that the output of the operating system, for example in response to a print command, generally is not intended to be transformed. An application typically is implemented so that the output of the printer in response to the operating system output matches the visual form of the data. Generally, applications are not tested for whether the commands sent to a printer can be scaled without distortion. Therefore, the visual form of the data 56 (See FIG. 1) output by the operating system 54 may need to be converted into a correct form of metafile that can be transformed without producing distortions.

Figure 14:
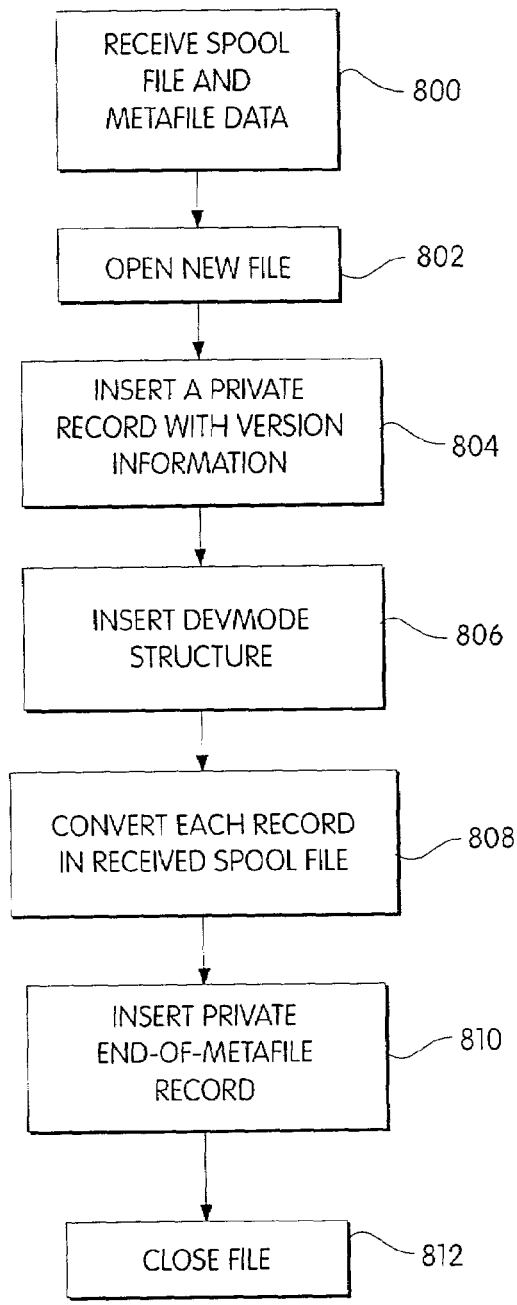
FIG. 14 is a flowchart describing processing of a spool file.

Such a conversion will now be described in connection with FIGS. 14 through 16, again using the Windows operating system and the Windows Metafile as an example. Referring now to FIG. 14, spool file 98 is received by the metafile processor 102 in step 800. The metafile processor, in step 802, opens a new file for each page in the spool file in which the new metafile(s) will be stored. A private record is inserted into this new file in step 804 to provide version information. For example, the operating system from which the application was printed and the version of the metafile processor program may be stored. This information permits a metafile to be processed differently according to the version information.

The "DEVMODE" structure available in Windows is copied and stored into a private record in the metafile in step 806. This data structure describes all of the characteristics of the printer and the print job, including page size, resolution and orientation. Any similar information available from other operating systems also may be stored. This record may be omitted if the information is provided accurately and completely in a header of the metafile(s) received from the spooler process.

In step 808, the metafile for a page obtained from the spool file is converted into a revised metafile for a page to improve its scalability according to the specifications for these data formats provided by the Microsoft Corporation, in a manner described in more detail below. During this step, the metafile processor inserts into the output file a comment record containing any original command, followed by the modified or new command. Retaining the original command facilitates in reconstructing the original for conversion to another format.

In step 810, the metafile processor inserts an end-of-file comment record at the end of the enhanced metafile data. The end-of-file comment record is used to delineate any boundary between metafiles contained within another metafile. Such metafiles can be thought of as "nested metafiles." When processed, a metafile can have different properties and characteristics depending upon the operating system platform and application with which it was created. For example, metafiles created on Windows NT can have different characteristics that those created on Windows 95. In order to ensure proper processing, the start and end points of each nested file are provided by the records inserted in steps 804 and 810.

In step 812, the metafile processor closes the new metafile file and provides the file which stores the filenames in files 105.

The conversion of commands in a metafile performed in step 808 will now be described in more detail. Various modifications are made because of differences between metafile types for different operating systems, and because metafiles created by printing by different applications generally are not designed to be scalable, and therefore sometimes are not.

Commands that produce potential resource leaks when a metafile is played, such as create font or other create commands, are identified. These commands may be processed to ensure that the resource is properly freed up.

Some applications generate metafiles that attempt to display text in coordinate transformation spaces that are incompatible with proper display of scaled, rotated or otherwise transformed text, such as a negative Y axis direction and incompatible mapping modes. The result is text that is incorrectly oriented or incorrectly scaled in the vertical and/or horizontal directions. The metafile processor detects this condition by identifying commands with the negative Y axis or an incompatible mapping mode. Before the record that displays the text, a metafile record is added to modify the coordinate transformation space temporarily. The new coordinate transformation is determined from the specified transformation, the coordinates of the text to be placed, the font orientation specified, the aspect ratios and the mapping mode, using known techniques. The coordinate transformation space is modified to preserve the intended position, orientation and aspect ratios. Another metafile record is added after the record that displays the text, to reset the coordinate transformation space to its original state.

Some metafiles generated by applications running on Windows NT contain records to "set miter limits." The metafile processor removes these records because they are not recognized by the Windows 95 GDI-32. The effect on the resulting image is negligible.

Some metafiles contain 16-, 24-, or 32-bit color bitmaps that contain color palettes. The metafile processor modifies the bitmap records by removing the color palettes because they are not needed and because they cause distortion of the bitmap when displayed.

Some metafiles display text aligned relative to the current cursor position causing the text position to be incorrectly determined in the viewer program and causing the text to disappear when printed to some devices. The metafile processor changes the text alignment record to specify alignment based on absolute coordinates rather than relative coordinates and then modifies each metafile record that displays text to contain the correct absolute coordinates, which may be determined using known techniques from the current cursor position, which can be obtained through a function call to Windows.

Font and text commands in general also are processed to improve their scalability in a manner described below in connection with FIGS. 15A–B and 16.

Figure 15A:
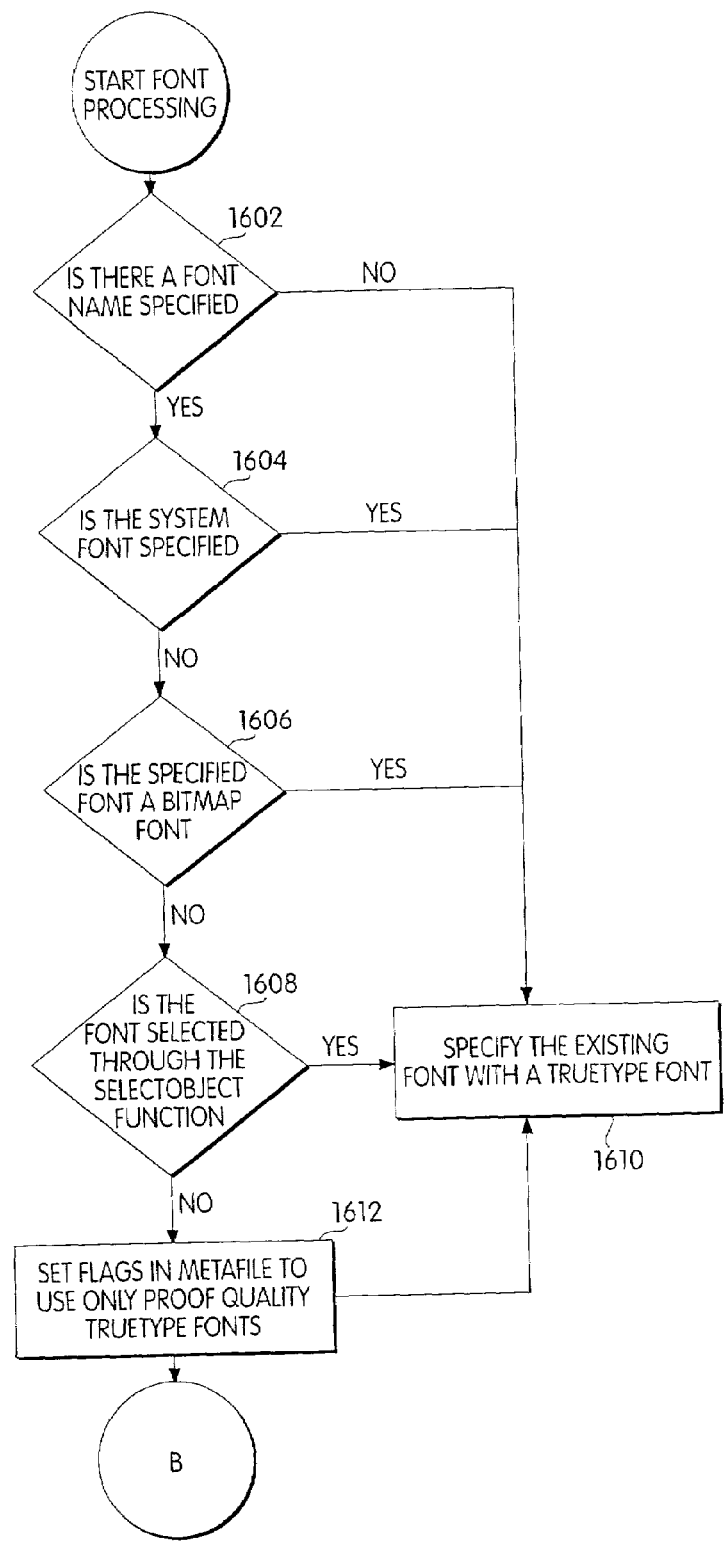
FIGS. 15A–B are a flow describing font processing of a spool file.
Figure 15B:
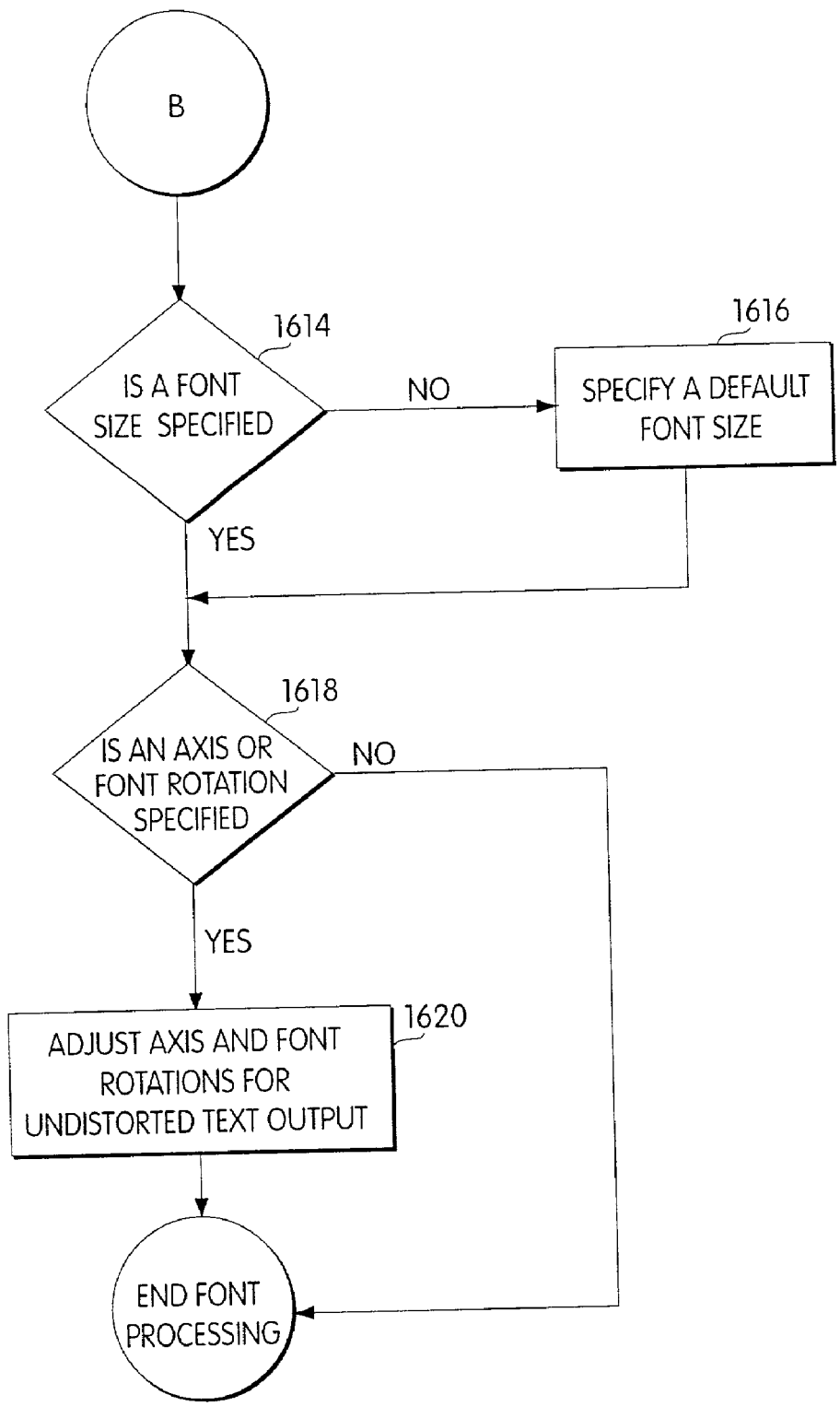
Figure 16:
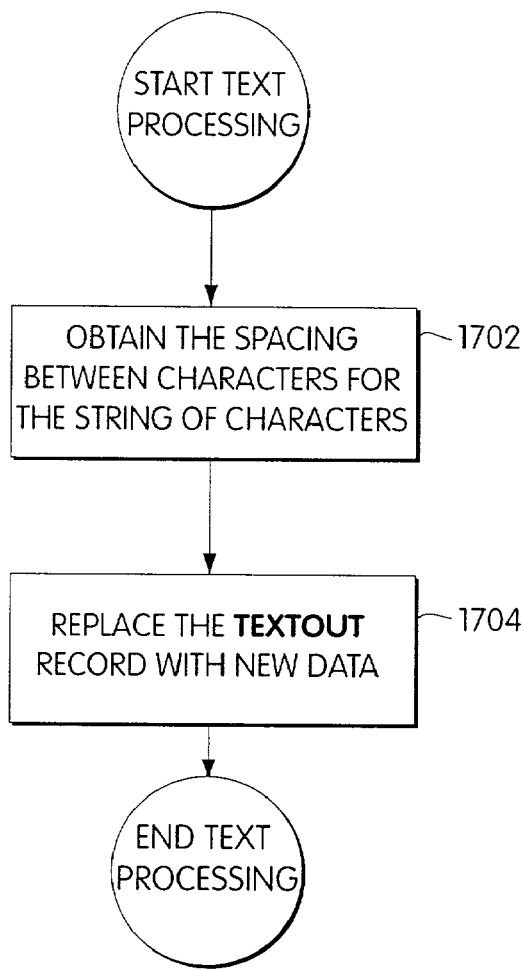
FIG. 16 is a flow chart describing text processing of a spool file.

Font processing is described in FIGS. 15A and 15B. Some applications generate metafiles that use non-scalable fonts. These metafiles are look correct when printed to a sheet of paper but are distorted when displayed at scalings different from that of a printer or on devices other than a printer. The metafile processor adds metafile records to specify scalable fonts to prevent this distortion. In steps 1602–1608 a series of decision points determines whether or not a TrueType font has been used in the metafile. In step 1602 if no font has been specified in the metafile, then a default TrueType font is selected, step 1610. In step 1604 if a System font has been selected, then a TrueType font is selected to replace it, in step 1610. In step 1606 if a bitmap font has been selected, then a TrueType font is selected to replace the bitmap font, in step 1610. In step 1608 if the application selects a font (sometimes called stock fonts) through the Windows SelectObject function, then a TrueType font is selected to replace the font selected through SelectObject, in step 1610. After completion of steps 1602–1610, two flags in the metafile are set to true to indicate that only proof quality TrueType fonts should be used in step 1612. In step 1614, if a font size has not been specified, then a default font size is selected, step 1616. The user previously may have selected font size and face names other than default values. Those values may be used in place of the default values. In step 1618, if an axis rotation or font rotation is encountered, which can cause a distorted output graphic, new values of the rotation or rotations are calculated in step 1620, in the manner described above.

Text processing will now be described in connection with FIG. 16. Some applications generate metafiles that contain text records that do not specify intercharacter spacing. The metafile processor calculates the proper intercharacter spacing values and modifies the text records using this process. Each metafile command is evaluated to determine if it is a TEXTOUT record. A TEXTOUT record is specified as containing an array of character spacing values. That is, for every character in a string to be printed, a value is supplied that indicates an amount of space to leave between it and the next character. This distance value might be absent. Therefore, when a TEXTOUT record without distance values is encountered, the correct distance values are obtained in step 1704, for example by a function call to the GDI-32. In step 1712 the old TEXTOUT record is replaced with the newly calculated data. The new record may include an additional field to indicate that it is an added record.

Additional text processing also may be performed in order to index any text in the metafile and store such an index as additional tag information for a report in the database. This index also may be represented as a doubly-linked list that could then be used by the report previewer 80 described above to permit text searching within the previewer.

Another form of text processing that may be performed, but in this case by the report previewer 80, is a conversion of text data, such as produced by TEXTOUT commands from a metafile, into character delimited data, such as tab-delimited data, which then may be converted into a table or spreadsheet. This process, described in connection with FIG. 17, may be used for any form of text data, including but not limited to, text data from a metafile within TEXTOUT commands. The process involves receiving selection coordinates specified by the user, for example, created by the user when selecting text displayed on the display. The selection coordinates generally define a rectangle within the display area. After the selection coordinates are received in step 1800, the text content within the selected coordinates is identified in step 1802. This step may be performed by playing each metafile command and comparing the coordinates of each command to the selection rectangle, or by examining the coordinates within a data structure such as the doubly-linked list described below.

The columns defined by the selected text are then detected. These columns are detected first by initializing a column detection data structure for the selected rectangle which may be for example an array of Boolean values, wherein each Boolean value corresponds to a horizontal logical coordinate on the display or a character in a string of characters. This array generally represents the horizontal dimension of the table. This array is used to detect any "white space" or absence of text that extends from the top to the bottom of the selected rectangle. For each command or text string within the selection coordinates, this column detection data structure is modified in step 1806. In particular, the Boolean value for each coordinate or character in the array of Boolean values is set to true if text is present at that coordinate from any of the text content identified within the selection rectangle. The end result of step 1806 is that each occurrence of one or more contiguous false values indicates a column boundary. In step 1808, using the Y coordinates for each text item, the text for each row is identified. A string, such as an ASCII string, of cell values separated by tab characters and with a carriage return at the end for each row of the table is then built. For each text item on a given row, its X coordinate is compared with the column detection structure to determine in which column it belongs. A current count is kept of the number of tabs inserted for each row. As each cell is added, the correct number of tab characters to precede it can be calculated. This operation correctly accounts for empty cells by inserting extra tabs as needed. The tab delimited text is generated from the text commands using this operation in step 1810. From the tab delimited text, other applications readily can convert such text into tables, or spreadsheet applications can insert values into individual cells in the spreadsheet.

Providing a system as described above, in which a standard format of the visual form of data from an application is captured into a database, permits data created, used and shared over a period of time by multiple different users with multiple different computer programs that are dispersed geographically to be centrally organized, managed and accessed in a manner that is independent of the applications that create the data. The database also provides a central repository in which data is in a single format which can be searched and read for display, printing or copying to other applications. The use of a single standard format permits the data to be viewed without the original application that viewed the data. Users also can create compound documents from multiple sources of data without a need to access the applications from which the data originated.

Having now described a few embodiments, it should be apparent to those skilled in the art that the foregoing is merely illustrative and not limiting, having been presented by way of example only. Numerous modifications may be made.

For example, the print command is used in the foregoing example because most applications at least have the ability to print a visual form of data that they manipulate and display. Other functions commonly used in applications, such as a "cut and paste" sequence also involve function calls to the operating system to translate data from one application to a different standard format in temporary storage, for example a "Clipboard" or an "Object linking and embedding (OLE) server" in Windows. This data may be retrieved from temporary storage by another application. These and other operating system functions could be used to provide access to standard format data which then may be stored in a database.

The send operation described above to transfer reports from the query interface or report previewer to another application also could be used to place data from a source application into a destination application that captures the data into a database.

Other operating systems also may be used. For example using Unix, PostScript data may be captured from an application and stored in the database. The PostScript data may be converted to a metafile format. Alternatively, a print driver could be prepared for any operating system.

These and other embodiments are within the scope of one of ordinary skill in the art and are contemplated as falling within the scope of the invention.

What is claimed is:

1. A method of viewing a visual form of data associated with tags comprising:

selecting a database containing a plurality of reports wherein each report includes a representation of a visual form of the data corresponding to one of a print form of the data or a display form of the data, each report having one or more associated tags, each of said associated tags including identifying information for said each report, wherein at least one of said tags is included in the visual form of the data, wherein horizontal and vertical coordinates identify a location of at least one text element in the visual form of the data;

selecting at least one report including one or more pages;

for each page of the at least one report, constructing a named temporary file for a metafile containing metafile data corresponding to said each page; and executing a previewer program which accesses a control file to view said visual form of the data represented by the metafile data included in said named temporary file corresponding to said each page, said control file including said at least one tag and a name of said named temporary file for each metafile corresponding to a page of the at least one report, wherein said previewer program obtains the visual form of the data for each page of the at least one report by playing the metafile data contained in the metafile corresponding to said each page, wherein said previewer program is operable to perform searching for instances of specified text in said at least one report by performing operations on the played metafile data, said searching further comprising:

identifying each text command in one or more metafiles of the at least one report and coordinates identifying a position of text in a text string associated with said each text command;

sorting text commands by page, Y coordinate position within a display, and X coordinate position within the display;

forming a list of records from said sorted text commands, wherein each record is associated with a text string and a position of the text string in the display; and concatenating a first text string of said text strings from said list with a second text string of said text strings from said list if said first and second text strings are within a predetermined percentage of text height.

2. The method of claim 1 further comprising:
playing the named temporary file to view said visual form of the data by issuing a play metafile command to an operating system.

3. The method of claim 1, wherein after selecting the at least one report, the method further includes:
selecting from one of printing, previewing and sending to another application the at least one report.

4. The method of claim 3, wherein selecting printing further includes:
transmitting the named temporary file to a printer device.

5. The method of claim 3, wherein sending the at least one report to another application includes:
creating a send control file including one or more tags, metafile names, a name associated with a destination application, and a set of keystrokes defining how a paste operation is performed in the destination application.

6. The method of claim 5, wherein sending the at least one report to another application further includes:
executing a separate program that uses the send control file to paste the at least one report in a predetermined location in the destination application.

7. The method of claim 1, wherein opening the selected database further includes:
prompting the user for a password.

8. The method of claim 1, further comprising:
selecting one of a sort and filter operation to be applied to records of the database associated with said list of reports; and
determining a visual indicator for each record to be displayed indicating whether said each record has been altered based on cyclic redundancy codes of tags for said each record.

9. The method of claim 1, further comprising:
querying the selected database in accordance with filter parameters.

10. The method of claim 9, further comprising:
indicating at least one selected record to the service layer from the query interface, said at least one selected record corresponding to the at least one report selected;
requesting metafiles associated with the at least one selected record from the service layer;
preparing a query statement at the service layer with the at least one report associated with the at least one selected record and pages of the at least one report as a filter;
executing the query statement on a metafile table associated with the database;
storing a metafile for each page of the at least one report in a temporary file;
constructing a list including one or more of report identifiers, page numbers and metafile names; and
providing the list to the query interface to process the list in a predetermined manner in accordance with the selecting from one of printing, previewing and sending to another application the at least one report.

11. The method of claim 9, further including scrolling through a list of records corresponding to reports to further display additional records.

12. The method of claim 9, wherein after opening the selected database, the method further includes copying records from the selected database to another database.

13. The method of claim 12, wherein copying records from the selected database to another database further includes:
receiving a user selection of one or more records at the query interface;
receiving a copy command at the query interface;
prompting the user for a destination database to be opened; and
copying the one or more records into the destination database.

14. The method of claim 1, wherein after opening the selected database the method further includes deleting records from the selected database.

15. The method of claim 14, wherein deleting records from the selected database includes:
receiving a user selection of one or more records for deletion at the query interface;
receiving a delete command at the query interface; and
deleting the selected one or more records for deletion from the database.

16. The method of claim 1, further comprising:
selecting a portion of a selected metafile using said previewer program.

17. The method of claim 16, further comprising:
forming a new metafile in accordance with said selecting said portion of said selected metafile.

18. The method of claim 17, further comprising:
representing a selection of said portion of said selected metafile using coordinates defining a rectangular-like shape;
comparing each command of the selected metafile to the coordinates, wherein said each command is included in the new metafile if said each command is one of: has no associated coordinates and produces display information within a shape formed by the coordinates; and
modifying said each command to be constrained within said coordinates if said each command produces display information that is both inside and outside the shape formed by the coordinates.

19. The method of claim 1, wherein at least one of said plurality of reports includes a command for at least one of: drawing an object, drawing a line, drawing a shape, drawing text, and controlling style of at least one element included in a report.

20. The method of claim 19, wherein said command is associated with a portion of a display or print area.

21. The method of claim 1, wherein the visual form of the data is represented in a vector image.

22. The method of claim 1, wherein the visual form of the data is represented in a metafile.

23. A computer program product for viewing a visual form of data associated with tags comprising:

machine executable code for selecting a database containing a plurality of reports wherein each report includes a representation of a visual form of the data corresponding to one of a print form of the data or a display form of the data, each report having one or more associated tags, each of said associated tags identifying information for said each report, wherein at least one of said tags is included in the visual form of the data, wherein horizontal and vertical coordinates identify a location of at least one text element in the visual form of the data;

machine executable code for selecting at least one report including one or more pages;

machine executable code for constructing, for each page of the at least one report, a named temporary file for a metafile containing metafile data corresponding to said each page; and machine executable code for executing a previewer program which accesses a control file to view said visual form of the data represented by metafile data included in said named temporary file corresponding to said each page, said control file including said at least one tag and a name of said named temporary file for each metafile corresponding to a page of the at least one report, wherein said previewer program obtains the visual form of the data for each page of the at least one report by playing the metafile data contained in the metafile corresponding to said each page, wherein said previewer program is operable to perform searching for instances of specified text in said at least one report by performing operations on the played metadata, and further comprising machine executable code for:

identifying each text command in one or more metafiles of the at least one report and coordinates identifying a position of text in a text string associated with said each text command;

sorting text commands by page, Y coordinate position within a display, and X coordinate position within the display;

forming a list of records from said sorted text commands, wherein each record is associated with a text string and a position of the text string in the display; and concatenating a first text string of said text strings from the list with a second text string of said text strings from the list if said first and second text strings are within a predetermined percentage of text height.

24. The computer program product of claim 23 further comprising:

machine executable code for playing the named temporary file to view said visual form of the data by issuing a play metafile command to an operating system.

25. The computer program product of claim 24, wherein the computer program product further includes:

machine executable code for selecting from one of printing, previewing and sending to another application the at least one report.

26. The computer program product of claim 25, wherein said machine executable code for selecting printing further includes:

machine executable code for transmitting the named temporary file to a printer device.

27. The computer program product of claim 25, wherein said machine executable code for sending the at least one report to another application includes:

machine executable code for creating a send control file including one or more tags, metafile names, a name associated with a destination application, and a set of keystrokes defining how a paste operation is performed in the destination application.

28. The computer program product of claim 27, wherein said machine executable code for sending the at least one report to another application further includes:

machine executable code for executing a separate program that uses the send control file to paste the at least one report in a predetermined location in the destination application.

29. The computer program product of claim 23, wherein said machine executable code for opening the selected database further includes:

machine executable code for prompting the user for a password.

30. The computer program product of claim 23, further comprising:

machine executable code for selecting one of a sort and filter operation to be applied to records of the database associated with said list of reports; and machine executable code for determining a visual indicator for each record to be displayed indicating whether said each record has been altered based on cyclic redundancy codes of tags for said each record.

31. The computer program product of claim 23, further comprising:

machine executable code for querying the selected database in accordance with filter parameters.

32. The computer program product of claim 31, further comprising:

machine executable code for indicating at least one selected record to the service layer from the query interface, said at least one selected record corresponding to the at least one report selected;

machine executable code for requesting metafiles associated with the at least one selected record from the service layer;

machine executable code for preparing a query statement at the service layer with the at least one report associated with the at least one selected record and pages of the at least one report as a filter;

machine executable code for executing the query statement on a metafile table associated with the database;

machine executable code for storing a metafile for each page of the at least one report in a temporary file;

machine executable code for constructing a list including one or more of report identifiers, page numbers and metafile names; and machine executable code for providing the list to the query interface to process the list in a predetermined manner in accordance with the selecting from one of printing, previewing and sending to another application the at least one report.

33. The computer program product of claim 31, further including machine executable code for scrolling through a list of records corresponding to reports to further display additional records.

34. The computer program product of claim 31, wherein after opening the selected database, the computer program product further includes machine executable code for copying records from the selected database to another database.

35. The computer program product of claim 34, wherein said machine executable code for copying records from the selected database to another database further includes:

machine executable code for receiving a user selection of one or more records at the query interface;

machine executable code for receiving a copy command at the query interface;

machine executable code for prompting the user for a destination database to be opened; and machine executable code for copying the one or more records into the destination database.

36. The computer program product of claim 23, wherein after opening the selected database the computer program product further includes machine executable code for deleting records from the selected database.

37. The computer program product of claim 36, wherein said machine executable code for deleting records from the selected database includes:

machine executable code for receiving a user selection of one or more records for deletion at the query interface;

machine executable code for receiving a delete command at the query interface; and machine executable code for deleting the selected one or more records for deletion from the database.

38. The computer program product of claim 23, further comprising:

machine executable code for selecting a portion of a selected metafile using said previewer program.

39. The computer program product of claim 38, further comprising:

machine executable code for forming a new metafile in accordance with said selecting said portion of said selected metafile.

40. The computer program product of claim 39, further comprising:

machine executable code for representing a selection of said portion of said selected metafile using coordinates defining a rectangular-like shape;

machine executable code for comparing each command of the selected metafile to the coordinates, wherein said each command is included in the new metafile if said each command is one of: has no associated coordinates and produces display information within a shape formed by the coordinates; and machine executable code for modifying said each command to be constrained within said coordinates if said each command produces display information that is both inside and outside the shape formed by the coordinates.

41. The computer program product of claim 23, wherein at least one of said plurality of reports includes a command for at least one of: drawing an object, drawing a line, drawing a shape, drawing text, and controlling style of at least one element included in a report.

42. The computer program product of claim 41, wherein said command is associated with a portion of a display or print area.

43. The computer program product of claim 23, wherein the visual form of the data is represented in a vector image.

44. The computer program product of claim 23, wherein the visual form of the data is represented in a metafile.

* * * * *